(12) United States Patent  (10) Patent No.: US 12,128,322 B2
Liu  (45) Date of Patent: Oct. 29, 2024

(54) METHOD AND APPARATUS FOR DRIVING VEHICLE IN VIRTUAL ENVIRONMENT, TERMINAL, AND STORAGE MEDIUM

(71) Applicant: TENCENT TECHNOLOGY (SHENZHEN) COMPANY LIMITED, Guangdong (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 211 days.

(21) Appl. No.: 17/683,815

(22) Filed: Mar. 1, 2022

(65) Prior Publication Data

US 2022/0184506 A1   Jun. 16, 2022

Related U.S. Application Data

(63) Continuation of application No. PCT/CN2020/012837, filed on Nov. 12, 2020.

(51) Int. Cl.
*A63F 13/803* (2014.01)
*A63F 13/52* (2014.01)
(Continued)

(52) U.S. Cl.
CPC ............ *A63F 13/803* (2014.09); *A63F 13/52* (2014.09); *A63F 13/5375* (2014.09);
(Continued)

(58) Field of Classification Search
CPC .... A63F 13/803; A63F 13/52; A63F 13/5375; A63F 13/5378; A63F 13/56; A63F 2300/8017
See application file for complete search history.

(56) References Cited

U.S. PATENT DOCUMENTS 10,434,411 B2 * 10/2019 Tezuka ................... A63F 13/25
11,151,773 B2 * 10/2021 Wang ...................... G06T 15/20
(Continued)

FOREIGN PATENT DOCUMENTS

CN    104931037 A    9/2015
CN    108245888 A    7/2018
(Continued)

OTHER PUBLICATIONS

International Search Report dated Jan. 13, 2021 in International Application No. PCT/CN2020/128377.
(Continued)

*Primary Examiner* — Malina D. Blaise
(74) *Attorney, Agent, or Firm* — Sughrue Mion, PLLC

(57) ABSTRACT

A method and apparatus for driving a vehicle in a virtual environment, a terminal, and a storage medium. The method includes: displaying a driving picture and a map display control, the driving picture being a picture in which a virtual object drives a virtual vehicle in a virtual environment, and the virtual vehicle being in a manual driving mode; receiving a marking operation on the map display control in response to the virtual vehicle being located in an automatic driving region in the virtual environment, the marking operation being an operation of marking a location in the map display control; and switching the virtual vehicle to an automatic driving mode in response to the marking operation, and controlling the virtual vehicle to automatically drive to a destination.

18 Claims, 9 Drawing Sheets

(51) Int. Cl.
  *A63F 13/5375* (2014.01)
  *A63F 13/5378* (2014.01)
  *A63F 13/56* (2014.01)

(52) U.S. Cl.
  CPC .......... *A63F 13/5378* (2014.09); *A63F 13/56* (2014.09); *A63F 2300/8017* (2013.01)

(56) References Cited

U.S. PATENT DOCUMENTS

| | | | |
|---|---|---|---|
| 2002/0169013 A1* | 11/2002 | Serizawa | A63F 13/5258 463/6 |
| 2007/0168288 A1 | 7/2007 | Bozeman | |
| 2012/0295230 A1* | 11/2012 | Esposito | A63F 13/803 434/69 |
| 2016/0059729 A1 | 3/2016 | Ishibashi | |
| 2016/0243441 A1* | 8/2016 | Garbowski | A63F 13/65 |
| 2019/0070495 A1* | 3/2019 | He | A63F 13/847 |
| 2019/0070497 A1* | 3/2019 | He | G06F 3/0488 |
| 2019/0076739 A1* | 3/2019 | Ge | A63F 13/537 |
| 2019/0126151 A1* | 5/2019 | Li | A63F 13/54 |
| 2020/0070044 A1* | 3/2020 | Seo | G06F 3/165 |
| 2020/0316470 A1* | 10/2020 | Yang | A63F 13/5372 |
| 2020/0316473 A1* | 10/2020 | Qiu | A63F 13/56 |
| 2020/0357163 A1* | 11/2020 | Wang | G06F 3/04815 |
| 2021/0354039 A1* | 11/2021 | Wan | A63F 13/822 |
| 2021/0383586 A1* | 12/2021 | Bao | G06T 13/205 |
| 2022/0347582 A1* | 11/2022 | Russo | A63F 13/428 |

FOREIGN PATENT DOCUMENTS

| | | |
|---|---|---|
| CN | 109011575 A | 12/2018 |
| CN | 110681156 A | 1/2020 |
| CN | 111228804 A | 6/2020 |

OTHER PUBLICATIONS

Written Opinion of the International Searching Authority dated Jan. 13, 2021 in International Application No. PCT/CN2020/128377.
"How to use Far Cry 5 Autopilot: How to use Far Cry 5 Autopilot Skills Analysis", 2018, Retrieved from: URL: <https://gl.ali213.net/html/2018-5/235173.html> (7 pages total).
Japanese Office Action dated May 16, 2023 in Japanese Application No. 2022-520700.
Se-Mook, "Final Fantasy XV Ultimania—Scenario Side—", Square Enix, First Edition, Section 5, Dec. 2016, pp. 409-456 (49 pages total).
Communication dated Mar. 19, 2024, issued in Korean Application No. 10-2022-7008387.
"Waveplate 15—first car trip (*** Rhea memory kinematic model which the vehicle remodeling, and the father is young)", <https://www.youtube.com/watch?v=VXmmhWOM75M>, Mar. 7, 2018 (1 page total).
"The depth-first search (DFS, Depth First Search)", <https://roxxy.tistory.com/entry/깊이-우선-탐색DFS-Depth-First-Search>, 2016 (11 pages total).
"About the UE4 Brush, BSP, and the PhysX Convex", <https://lifeisforu.tistory.com/361>, Apr. 2, 2017 (12 pages total).

* cited by examiner

METHOD AND APPARATUS FOR DRIVING VEHICLE IN VIRTUAL ENVIRONMENT, TERMINAL, AND STORAGE MEDIUM

CROSS-REFERENCE TO RELATED APPLICATION(S)

This application is a continuation application of International Application No. PCT/CN2020/128377, filed on Nov. 12, 2020, which claims priority to Chinese Patent Application No. 202010080028.6, filed with the China National Intellectual Property Administration on Feb. 4, 2020, the disclosures of which are incorporated by reference in their entireties.

FIELD

The present disclosure relates to the field of human-computer interaction, and in particular, to a method and apparatus for driving a vehicle in a virtual environment, a terminal, and a storage medium.

BACKGROUND

A first-person shooting (FPS) game is an application program based on a three-dimensional (3D) virtual environment. A user may control a virtual object in the virtual environment to perform actions such as walking, running, climbing, and shooting, and a plurality of users may form a team online to collaboratively complete a task in the same virtual environment.

When the virtual object needs to be controlled from a current location to another location in the virtual environment, and a distance between the two locations is relatively long, the user may control the virtual object to drive a virtual vehicle (such as a car, an airplane, or a motorcycle) disposed in the virtual environment to deliver the virtual object to the destination through the virtual vehicle. The user needs to control the virtual vehicle to drive through driving controls. The driving controls include a steering control, an acceleration control, a deceleration control, a brake control, a horn control, a gear shift control, and the like.

Due to the large quantity of the driving controls, it is more difficult for a user (especially a user who uses the virtual vehicle for the first time) to control the virtual object to drive the vehicle.

SUMMARY

Embodiments of the disclosure provide a method and apparatus for driving a vehicle in a virtual environment, a terminal, and a storage medium, which can reduce the operation difficulty of a user to control a virtual object to drive a vehicle. The technical solutions are as follows:

According to an aspect, an embodiment of the disclosure provides a method for driving a vehicle in a virtual environment, performed by a terminal, the method including:
  displaying a driving picture and a map display control, the
    driving picture being a picture in which a virtual object
    drives a virtual vehicle in a virtual environment, and the
    virtual vehicle being in a manual driving mode;
  receiving a marking operation on the map display control
    in response to the virtual vehicle being located in an
    automatic driving region in the virtual environment, the
    marking operation being an operation of marking a
    location in the map display control; and
  switching the virtual vehicle to an automatic driving mode
    in response to the marking operation, and controlling
    the virtual vehicle to automatically drive to a destination.

According to another aspect, an embodiment of the disclosure provides an apparatus for driving a vehicle in a virtual environment, including:
  a display module, configured to display a driving picture
    and a map display control, the driving picture being a
    picture in which a virtual object drives a virtual vehicle
    in a virtual environment, and the virtual vehicle being
    in a manual driving mode;
  a receiving module, configured to receive a marking
    operation on the map display control in response to the
    virtual vehicle being located in an automatic driving
    region in the virtual environment, the marking operation being an operation of marking a location in the
    map display control; and
  a control module, configured to switch the virtual vehicle
    to an automatic driving mode in response to the marking operation, and control the virtual vehicle to automatically drive to a destination.

According to another aspect, an embodiment of the disclosure provides a terminal, including a processor and a memory, the memory storing at least one instruction, at least one program, a code set, or an instruction set, the at least one instruction, the at least one program, the code set, or the instruction set being loaded and executed by the processor to implement the method for driving a vehicle in a virtual environment described in the foregoing aspect.

According to another aspect, a computer-readable storage medium is provided, storing at least one instruction, at least one program, a code set, or an instruction set, the at least one instruction, the at least one program, the code set, or the instruction set being loaded and executed by a processor to implement the method for driving a vehicle in a virtual environment described in the foregoing aspect.

According to another aspect, a computer program product or a computer program is provided, the computer program product or the computer program including computer instructions, the computer instructions being stored in a computer-readable storage medium. A processor of the computer device reads the computer instructions from the computer-readable storage medium and executes the computer instructions, to cause the computer device to perform the method for driving a vehicle in a virtual environment provided in the foregoing aspect.

By using the method provided in the embodiments of the disclosure, when the virtual vehicle drives to the automatic driving region in the virtual environment in the manual driving mode, the virtual vehicle is switched to the automatic driving mode according to the marking operation if the marking operation on the map display control is received, and the virtual vehicle is controlled to automatically drive to the destination. There is no need for the user to manually control the virtual vehicle, which simplifies the process of controlling the virtual vehicle to drive, and reduces the operation difficulty of the user to control the virtual vehicle to drive in the virtual environment.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
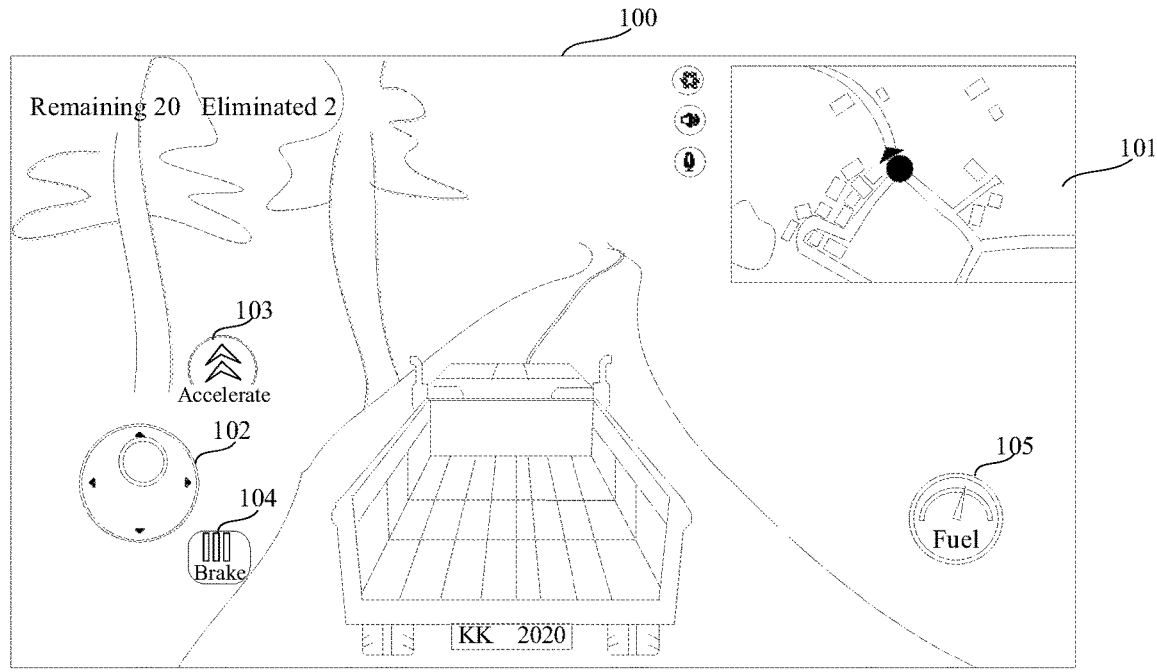
FIG. 1 is a schematic diagram of an interface of a process of manually controlling a virtual vehicle to drive in the related art.

To make objectives, technical solutions, and advantages of the disclosure clearer, the following further describes implementations of the disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure First, terms involved in the embodiments of the disclosure are introduced:

Virtual environment: It is a virtual environment displayed (or provided) by an application program when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a 3D virtual environment. This is not limited in the disclosure. A description is made by using an example in which the virtual environment is a 3D virtual environment in the following embodiments.

Virtual object: It is a movable object in a virtual environment. The movable object may be a virtual character, a virtual animal, a cartoon character, or the like, such as a character, an animal, a plant, an oil drum, a wall, a stone, or the like displayed in a 3D virtual environment. Optionally, the virtual object is a 3D model created based on a skeletal animation technology. Each virtual object has a shape and size in the 3D virtual environment, and occupies some space in the 3D virtual environment.

Virtual vehicle: It is a vehicle that can be driven by a virtual object in a virtual environment. The virtual vehicle may be a virtual car, a virtual motorcycle, a virtual plane, a virtual bicycle, a virtual tank, a virtual boat, or the like. The virtual vehicle may be randomly disposed in the virtual environment. Each virtual vehicle has a respective shape and size in the 3D virtual environment and occupies some space in the 3D virtual environment, and may collide with other virtual objects (such as houses and trees) in the 3D virtual environment.

FPS game: It is a shooting game in which a user can play from a first-person perspective. A virtual environment picture in the game is a picture of a virtual environment observed from a perspective of a first virtual object. In the game, at least two virtual objects play in a single-round battle mode in the virtual environment. The virtual object escapes attacks by other virtual objects and dangers (such as a poison gas area and a swamp) in the virtual environment to survive in the virtual environment. When the hit point of the virtual object in the virtual environment is zero, the life of the virtual object in the virtual environment ends, and the final virtual object surviving in the virtual environment wins. For example, a battle starts with a moment when a first client joins the battle, and ends with a moment when the last client exits the battle. Each client may control one or more virtual objects in the virtual environment. Arena modes of the battle may include a single-player battle mode, a two-player team battle mode, or a multi-player team battle mode. The battle mode is not limited in the embodiments of the disclosure.

UI control: It is any visual control or element that can be seen in a UI of an application program, for example, a control such as a picture, an input box, a text box, a button, or a label. Some UI controls respond to an operation of a user. For example, the user triggers a UI control corresponding to a dagger item, to control the virtual object to switch a currently used gun to a dagger. For example, when driving a vehicle, the UI displays driving controls, and the user may control the virtual object to drive the virtual vehicle by triggering the driving controls.

The method provided in the disclosure may be applied to a virtual reality (VR) application program, a 3D map program, a military simulation program, an FPS game, a multiplayer online battle arena (MOBA) game, and the like. An application in a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combatting, driving, switching to virtual items, and using a virtual item to attack another virtual object, which has relatively high interactivity. In addition, a plurality of users may form a team online to perform an arena game.

FIG. 1 is a schematic diagram of an interface of a process of controlling a virtual vehicle to drive in the related art.

When the user controls the virtual object to drive the virtual vehicle (the virtual vehicle in FIG. 1 is a virtual car), a UI 100 displays a driving picture, and the UI 100 displays a map display control 101, driving controls (including a direction control 102, an acceleration control 103, and a brake control 104), and a vehicle fuel indicator 105. The user may view a current location and the surrounding environment of the virtual object through the map display control 101, may control the virtual vehicle to move forward, move backward, and turn through the direction control 102, may control the acceleration of the virtual vehicle through the acceleration control 103, may control the virtual vehicle to stop quickly through the brake control 104, and may learn the remaining fuel of the virtual vehicle through the vehicle fuel indicator 105.

When using the foregoing method to manually control the virtual vehicle to drive, the user needs to operate different driving controls according to the current environment of the virtual vehicle, and needs to manually select a driving route. For novice users, the operation is more difficult. If the user does not operate properly or selects a wrong route, it takes a large quantity of time to drive to a destination.

Figure 2:
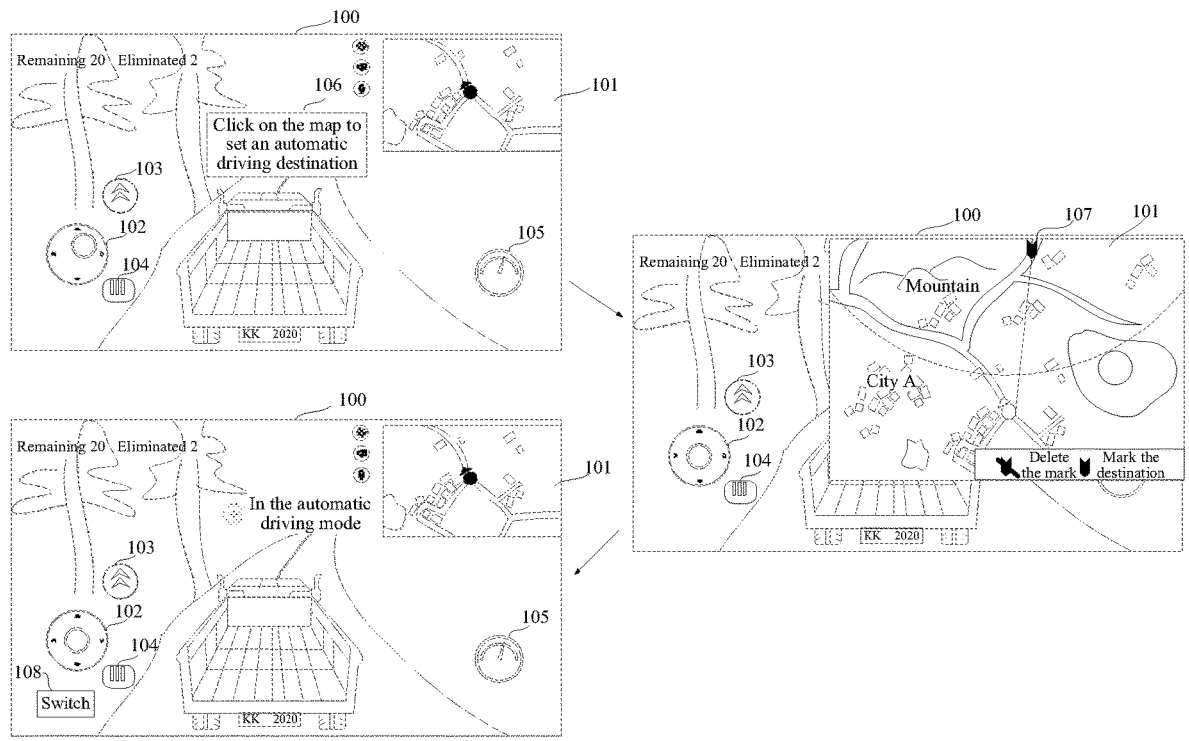
FIG. 2 is a schematic diagram of an interface of a process of driving a vehicle in a virtual environment according to an example embodiment of the disclosure.

This embodiment of the disclosure provides a method for driving a vehicle in a virtual environment. FIG. 2 is a schematic diagram of an interface of a process of driving a vehicle in a virtual environment according to an example embodiment of the disclosure.

In a possible implementation, when the user controls the virtual vehicle to drive in the virtual environment through the driving controls (including the driving controls shown in FIG. 1), if the virtual vehicle is in an automatic driving region, the terminal displays automatic driving prompt information 106 in the UI 100, to prompt the user to switch the virtual vehicle to an automatic driving mode. Further, when a trigger operation on the map display control 101 is received, the enlarged map display control 101 is displayed in the UI 100, and a destination 107 marked in the map display control 101 by the user is received. After the destination is marked, the terminal switches the virtual vehicle to the automatic driving mode, and controls the virtual vehicle to automatically drive to the destination in the automatic driving mode without manually touching the driving controls by the user. Moreover, after the automatic driving mode is switched, the UI 108 further displays a driving mode switching control 108. The user may switch the virtual vehicle to a manual driving mode again by clicking the driving mode switching control 108, and then manually control the virtual vehicle to drive through the driving controls.

In the related art, the user needs to manually operate the driving controls to control the virtual vehicle, and needs to autonomously select the driving route during the driving. In contrast, by using the method provided in this embodiment of the disclosure, the user only needs to control the virtual vehicle to drive to an automatic driving region, and set an automatic driving destination through the map display control. The terminal may then automatically determine the driving route and control the virtual vehicle to drive without manual operation by the user, which simplifies the control process of the virtual vehicle, reduces the operation difficulty of the virtual vehicle, and helps shorten the time required for the virtual vehicle to reach the destination.

Figure 3:
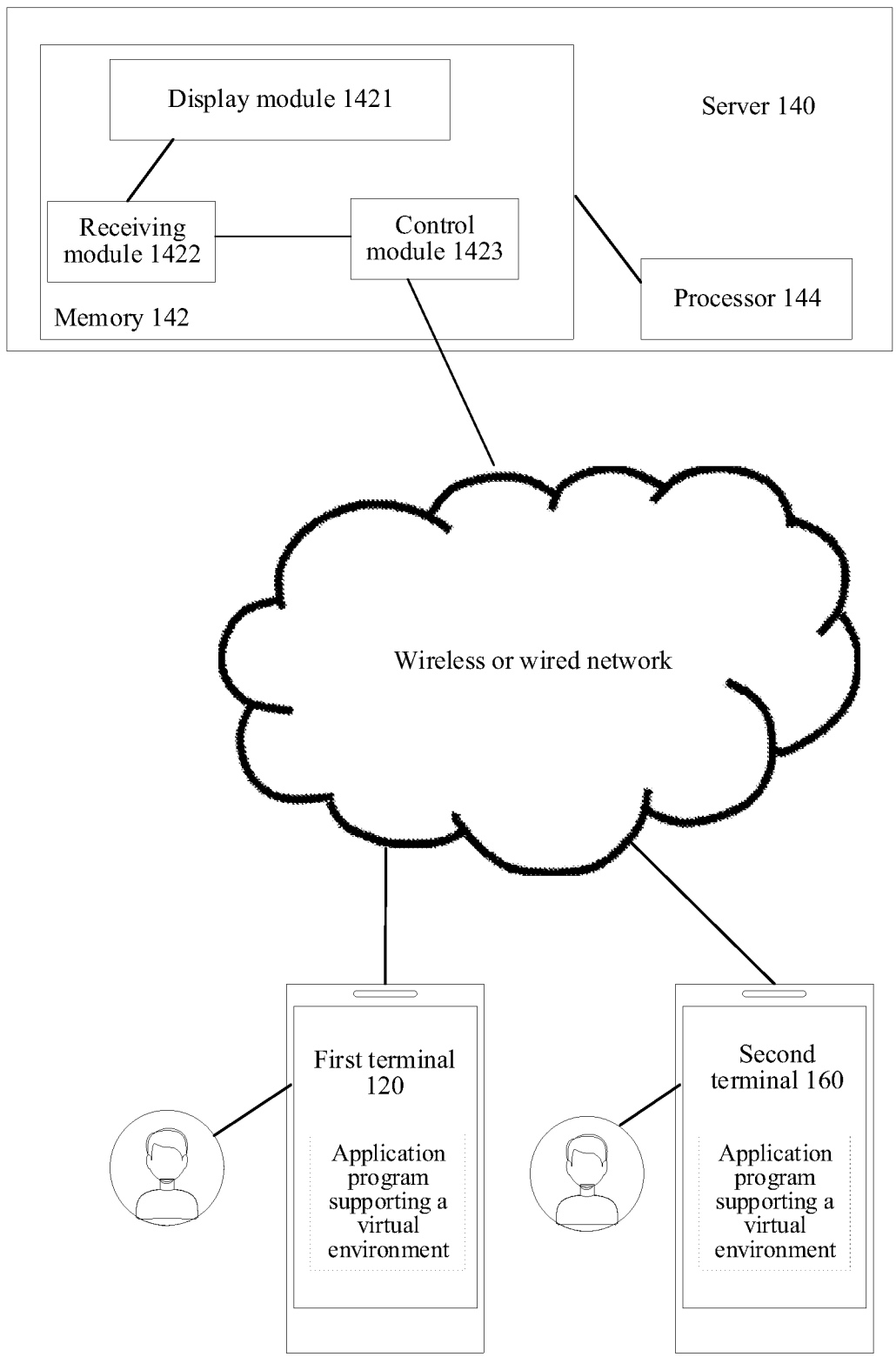
FIG. 3 is a schematic diagram of an implementation environment according to an example embodiment of the disclosure.

FIG. 3 is a schematic diagram of an implementation environment according to an example embodiment of the disclosure. The implementation environment includes: a first terminal 120, a server 140, and a second terminal 160.

An application program supporting a virtual environment is installed and run on the first terminal 120. The application program may be any one of a VR application program, a 3D map application, a military simulation program, an FPS game, a MOBA game, or a multiplayer gunfight survival game. The first terminal 120 is a terminal used by a first user. The first user uses the first terminal 120 to control a first virtual object in a virtual environment to perform motions. The motions include, but are not limited to, at least one of body posture adjustment, crawling, walking, running, cycling, jumping, driving, shooting, throwing, switching to virtual items, or using a virtual item to attack another virtual object. For example, the first virtual object is a first virtual character, such as a simulated character object or a cartoon character object.

The first terminal 120 is connected to the server 140 by using a wireless network or a wired network.

The server 140 includes at least one of one server, a plurality of servers, a cloud computing platform, or a virtualization center. For example, the server 140 includes a processor 144 and a memory 142. The memory 142 includes a display module 1421, a receiving module 1422, and a control module 1423. The server 140 is configured to provide a backend service for an application program supporting a 3D virtual environment. For example, the server 140 is responsible for primary computing work, and the first terminal 120 and the second terminal 160 are responsible for secondary computing work; or the server 140 is responsible for secondary computing work, and the first terminal 120 and the second terminal 160 are responsible for primary computing work; or the server 140, the first terminal 120 and the second terminal 160 perform collaborative computing by using a distributed computing architecture among each other.

An application program supporting a virtual environment is installed and run on the second terminal 160. The application program may be any one of a VR application program, a 3D map application, a military simulation program, an FPS game, a MOBA game, or a multiplayer gunfight survival game. The second terminal 160 is a terminal used by a second user. The second user uses the second terminal 160 to control a second virtual object in a virtual environment to perform motions. The motions include, but are not limited to, at least one of body posture adjustment, crawling, walking, running, cycling, jumping, driving, shooting, throwing, switching to virtual items, or using a virtual item to attack another virtual object. For example, the second virtual object is a second virtual character, such as a simulated character object or a cartoon character object.

The first virtual person and the second virtual person may be located in the same virtual environment. The first virtual person and the second virtual person may belong to the same team or the same organization, have a friend relationship, or have a temporary communication permission.

The application programs installed on the first terminal 120 and the second terminal 160 are the same, or the application programs installed on the two terminals are the same type of application programs in different control system platforms. The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same device type or of different device types. The device type includes at least one of a smartphone, a tablet computer, an e-book reader, a digital player, a laptop, or a desktop computer. The following embodiment is described by using an example that the terminal includes a smartphone.

A person skilled in the art may learn that there may be more or fewer terminals. For example, there may be only one terminal, or there may be dozens of or hundreds of terminals or more. The quantity and the device type of the terminal are not limited in the embodiments of this application.

Figure 4:
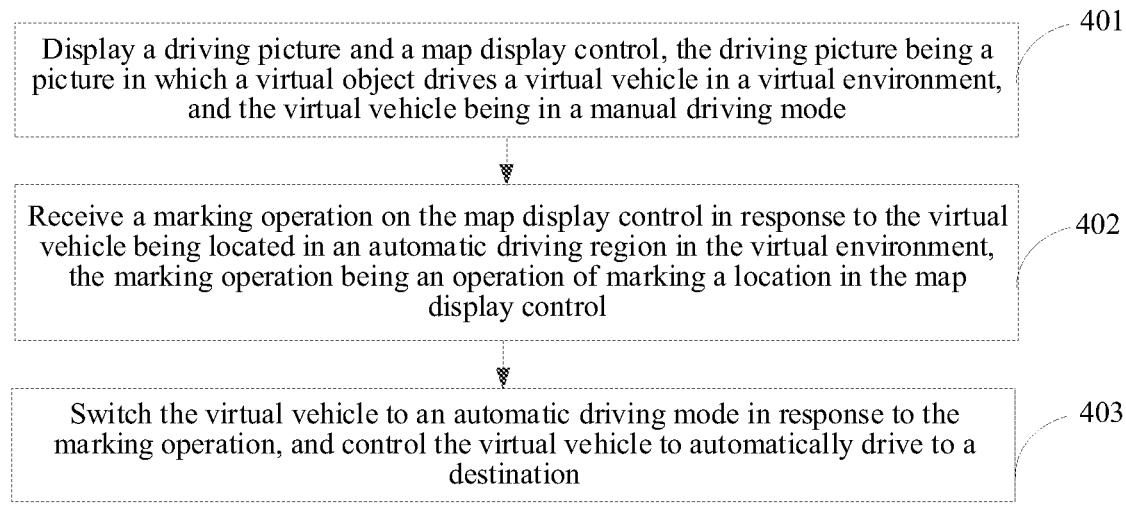
FIG. 4 is a flowchart of a method for driving a vehicle in a virtual environment according to an example embodiment of the disclosure.

FIG. 4 is a flowchart of a method for driving a vehicle in a virtual environment according to an example embodiment of the disclosure. This embodiment is described by using an example in which the method is applied to the first terminal 120 or the second terminal 160 in the implementation environment shown in FIG. 3 or another terminal in the implementation environment. The method includes the following operations:

Operation 401: Display a driving picture and a map display control, the driving picture being a picture in which a virtual object drives a virtual vehicle in a virtual environment, and the virtual vehicle being in a manual driving mode.

In a possible implementation, the driving picture and the map display control are displayed in the UI, and the map display control is superimposed and displayed on the driving picture.

The UI is an interface of an application program that supports a virtual environment, and the UI includes a virtual environment picture and controls corresponding to various functions. In the embodiments of the disclosure, the virtual environment picture is the driving picture.

The virtual environment picture is a picture of the virtual environment observed from the perspective of the virtual object. The perspective is an observation angle for observation from a first-person perspective or a third-person perspective of the virtual object in the virtual environment. In the embodiments of the disclosure, the perspective is an angle for observing the virtual object by using a camera model in the virtual environment.

The camera model automatically follows the virtual object in the virtual environment. That is, when a position of the virtual object in the virtual environment changes, a position of the camera model following the virtual object in the virtual environment changes simultaneously, and the camera model is always within a preset distance range from the virtual object in the virtual environment. In the automatic following process, relative positions of the camera model and the virtual object remain unchanged.

The camera model is a 3D model located around the virtual object in the 3D virtual environment. When a first-person perspective is used, the camera model is located around the head of the virtual object or located at the head of the virtual object. When a third-person perspective is used, the camera model may be located behind the virtual object and bound to the virtual object, or may be located at any position away from the virtual object by a preset distance. The virtual object located in the virtual environment may be observed from different angles through the camera model. When the third-person perspective is a first-person over-shoulder perspective, the camera model is located behind the virtual object (for example, the head and the shoulders of the virtual object). In addition to the first-person perspective and the third-person perspective, there are other perspectives, for example, a top perspective. When the top perspective is used, the camera model may be located above the head of the virtual object. The top perspective is a perspective of the virtual environment observed at an angle from the air. Optionally, the camera model is not actually displayed in the virtual environment. In other words, the camera model is not displayed in the virtual environment displayed in the UI.

A description is made by using an example in which the camera model is located at any position at a preset distance from the virtual object. One virtual object corresponds to one camera model, and the camera model may rotate with the virtual object as a rotation center. For example, the camera model is rotated with any point of the virtual object as the rotation center. During rotation, the camera model is not only rotated, but also displaced. During rotation, a distance between the camera model and the rotation center remains unchanged, that is, the camera model is rotated on a surface of a sphere with the rotation center as a sphere center. Any point of the virtual object may be the head or the torso of the virtual object, or any point around the virtual object. This is not limited in the embodiments of the disclosure. When the camera model observes the virtual object, a center of the perspective of the camera model points to a direction from a point on the spherical surface at which the camera model is located to the sphere center.

For example, as shown in FIG. 2, the driving picture is a picture of the virtual environment observed from the third-person perspective. Certainly, in other possible embodiments, the driving picture may alternatively be a picture of the virtual environment observed from the first-person perspective. This is not limited in this embodiment.

Other elements in the virtual environment are further displayed in the driving picture, including at least one of a mountain, a plain, a river, a lake, a sea, a desert, sky, a plant, or a building.

The map display control is a control used to display the map situation of all or part of regions in the virtual environment. The map picture displayed in the map display control is a picture of the virtual environment observed from a top perspective.

In addition to displaying the virtual environment, the map display control further displays an object identifier of the current virtual object. The object identifier is displayed in the center of the map displayed by the map display control, and when the position of the virtual object in the virtual environment changes, the map displayed by the map display control also changes correspondingly.

In addition to displaying the driving picture and map display control, the UI further displays driving controls for controlling the virtual vehicle in the manual driving mode. The types and quantity of driving controls corresponding to different virtual vehicles may be different. For example, when the virtual object drives a virtual car, driving controls displayed on the UI may include a direction control, an acceleration control, and a brake control. When the virtual object drives a virtual motorcycle, driving controls displayed on the UI may include a direction control, an acceleration control, a brake control, a head-up control, and a head-down control. The types and distribution positions of the driving controls in the UI are not limited in this embodiment of the disclosure.

For example, as shown in FIG. 2, the UI 100 includes the direction control 102, the acceleration control 103, and the brake control 104.

Operation 402: Receive a marking operation on the map display control in response to the virtual vehicle being located in an automatic driving region in the virtual environment, the marking operation being an operation of marking a location in the map display control.

In this embodiment of the disclosure, the virtual vehicle is not capable of automatic driving in any region in the virtual environment, but can only perform automatic driving in the automatic driving region. In an example embodiment, an automatic driving region is preset in the virtual environment, and only when the virtual vehicle is located in the automatic driving region, the user can set a destination of the automatic driving through the map display control.

The automatic driving region includes a preset road in the virtual environment, that is, the user needs to manually control the virtual vehicle to drive to the preset road before setting the destination of the automatic driving. Certainly, outside the preset road, other regions with simple environments (that is, regions including fewer environment elements) in the virtual environment can also be set as automatic driving regions, and the specific type of the automatic driving region is not limited in this embodiment.

The terminal detects in real time whether the virtual vehicle is located in the automatic driving region. If it is detected that the virtual vehicle is located in the automatic driving region, prompt information is displayed on the UI to prompt the user to set the destination of automatic driving through the map display control, and then the automatic driving mode is entered.

In a possible implementation, when receiving a viewing operation on the map display control, the terminal displays the enlarged map, and further receives a marking operation on the map display control, where the marking operation may be a click operation on a region on the map. Correspondingly, a click position corresponding to the click operation is a marked location.

When the virtual vehicle is outside the automatic driving region, or the virtual object is not driving the vehicle, the user can also perform a marking operation on the map display control. However, a location indicated by the marking operation is not used to control the virtual vehicle for automatic driving, but only has a location marking function to indicate a relative position of the marked location and the current location of the virtual object.

The user can perform the marking operation only when the virtual object controlled by the terminal is the driver of the virtual vehicle. Correspondingly, if the virtual object is the occupant of the virtual vehicle, the user cannot perform the marking operation (that is, the user has no permission to set up automatic driving).

Operation 403: Switch the virtual vehicle to an automatic driving mode in response to the marking operation, and control the virtual vehicle to automatically drive to a destination.

Further, the terminal switches the virtual vehicle to the automatic driving mode according to the marking operation, and determines the destination of the automatic driving, thereby controlling the virtual vehicle to automatically drive to the destination. A driving path of the virtual vehicle from the current location to the destination is automatically planned by the terminal.

In an example embodiment, all virtual vehicles in the virtual environment support the automatic driving mode.

In another example embodiment, a preset virtual vehicle in the virtual environment supports the automatic driving mode. When the virtual vehicle is a preset virtual vehicle, the terminal switches the virtual vehicle to the automatic driving mode in response to the marking operation. The preset virtual vehicles may include a virtual car, a virtual tank, and a virtual ship, but does not include a virtual bicycle or a virtual motorcycle.

In the automatic driving mode, the terminal may display mode prompt information to prompt the user that the virtual vehicle is currently in the automatic driving mode.

In an example embodiment, in the automatic driving mode, the user cannot manually control the virtual vehicle; or the user can still manually control the virtual vehicle again through the driving controls and after manually controlling the virtual vehicle, the virtual vehicle exits the automatic driving mode.

If the marking operation on the map is received again in the automatic driving mode, the terminal updates the destination according to the marking operation and controls the virtual vehicle to automatically drive to the updated destination.

Based on the above, in the embodiments of the disclosure, when the virtual vehicle drives to the automatic driving region in the virtual environment in the manual driving mode, the virtual vehicle is switched to the automatic driving mode according to the marking operation if the marking operation on the map display control is received, and the virtual vehicle is controlled to automatically drive to the destination. There is no need for the user to manually control the virtual vehicle, which simplifies the process of controlling the virtual vehicle to drive, and reduces the operation difficulty of the user to control the virtual vehicle to drive in the virtual environment.

In addition, when manually controlling the virtual vehicle, the user needs to frequently perform a control operation. Correspondingly, the terminal needs to frequently detect the control operation and responds to the control operation (for example, the terminal needs to detect and respond to touch operations received on the touch screen), resulting in a large amount of data processed by the terminal during automatic driving, and further increasing the power consumption of the terminal. In contrast, by using the solution provided in the embodiments of the disclosure, the terminal can automatically drive to the destination based on the mark without the control operation of the user during the automatic driving, thereby reducing the frequency of the control operation detection and response by the terminal in the driving process of the virtual vehicle, and further reducing the amount of data processed by the terminal, which helps reduce the power consumption of the terminal.

In addition, the terminal only needs to transmit the destination to another terminal through the server, and the another terminal can restore the virtual vehicle in automatic driving according to the destination, without the need to forward real-time control data and location data to the another terminal through the server, which reduces the amount of data forwarded by the server, and reduces the data forwarding pressure of the server.

Different from the automatic driving function of the real vehicle (which requires complex image recognition technologies such as vehicle recognition and lane recognition), in the embodiments of the disclosure, to reduce the difficulty and computation amount of realizing the automatic driving function of the virtual vehicle, the virtual vehicle can only perform automatic driving in the automatic driving region (for example, the preset road), that is, an automatic driving path of the virtual vehicle is located in the automatic driving region. The process of realizing the automatic driving function is described below by using an example embodiment.

Figure 5:
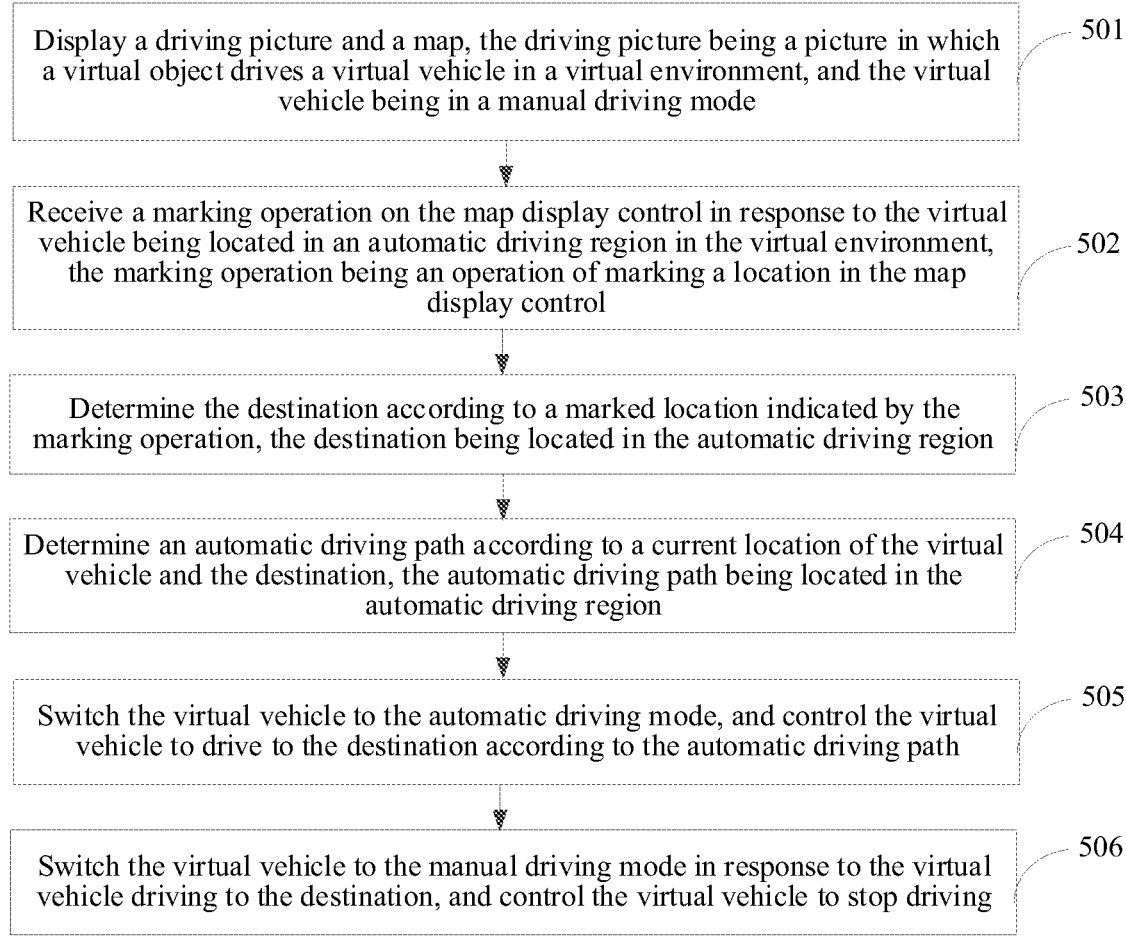
FIG. 5 is a flowchart of a method for driving a vehicle in a virtual environment according to an example embodiment of the disclosure.

FIG. 5 is a flowchart of a method for driving a vehicle in a virtual environment according to another example embodiment of the disclosure. This embodiment is described by using an example in which the method is applied to the first terminal 120 or the second terminal 160 in the implementation environment shown in FIG. 3 or another terminal in the implementation environment. The method includes the following operations:

Operation 501: Display a driving picture and a map display control, the driving picture being a picture in which a virtual object drives a virtual vehicle in a virtual environment, and the virtual vehicle being in a manual driving mode.

For the implementation of operation 501, reference may be made to operation 401, and details are not described again in this embodiment.

Operation 502: Receive a marking operation on the map display control in response to the virtual vehicle being located in an automatic driving region in the virtual environment, the marking operation being an operation of marking a location in the map.

Regarding the method of determining whether the virtual vehicle is located in the automatic driving region, in a possible embodiment, in addition to setting collision detection boxes for virtual objects in the virtual environment (such as virtual vehicles, virtual houses, virtual roadblocks, and virtual trees), in this embodiment of the disclosure, the automatic driving region in the virtual environment is also provided with collision detection boxes, and the collision detection boxes are used to detect that other virtual objects in the virtual environment enter the automatic driving region.

Figure 6:
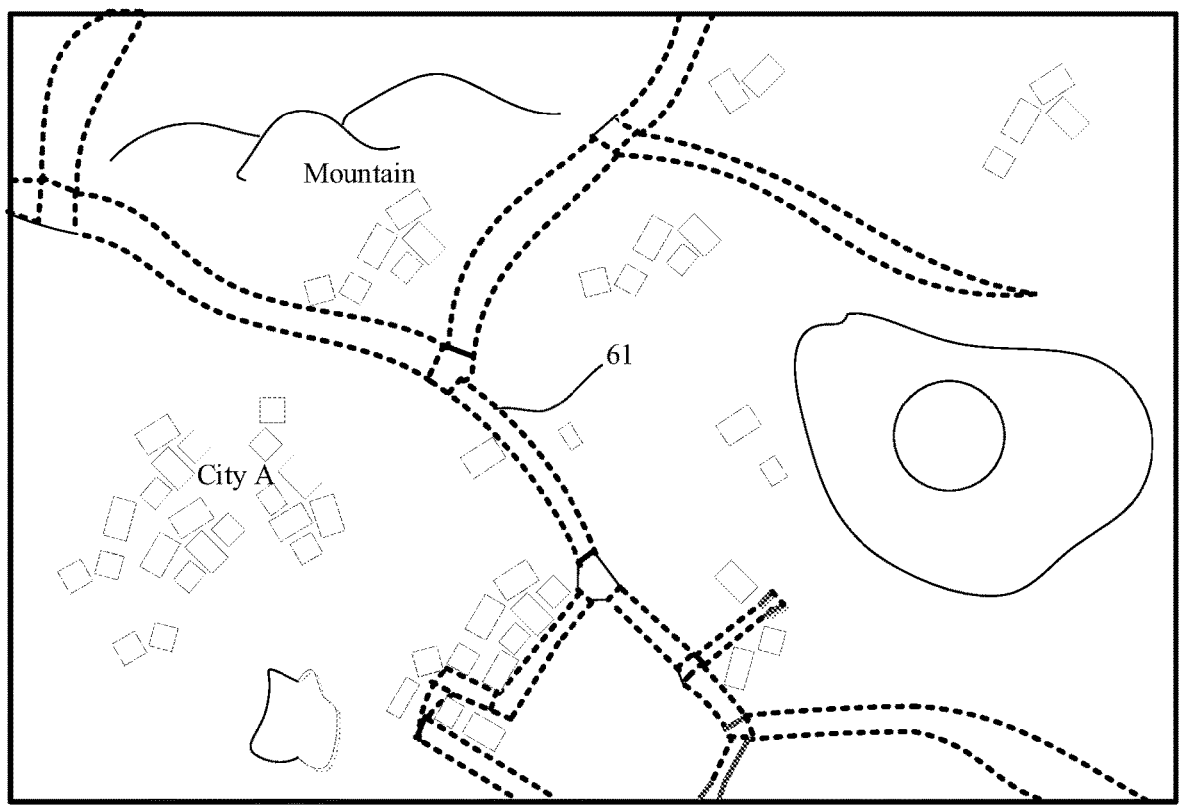
FIG. 6 is a schematic diagram of a collision detection box corresponding to an automatic driving region according to an example embodiment of the disclosure.

For example, as shown in FIG. 6, when the automatic driving region is a preset road in the virtual environment, each preset road corresponds to respective collision detection boxes 61 (the dotted region in the figure is a range of the collision detection boxes).

The terminal determines that the virtual vehicle is located in the automatic driving region in response to a collision between a first collision detection box and a second collision detection box, the first collision detection box being a collision detection box corresponding to the virtual vehicle, and the second collision detection box being a collision detection box corresponding to the automatic driving region.

Figure 7:
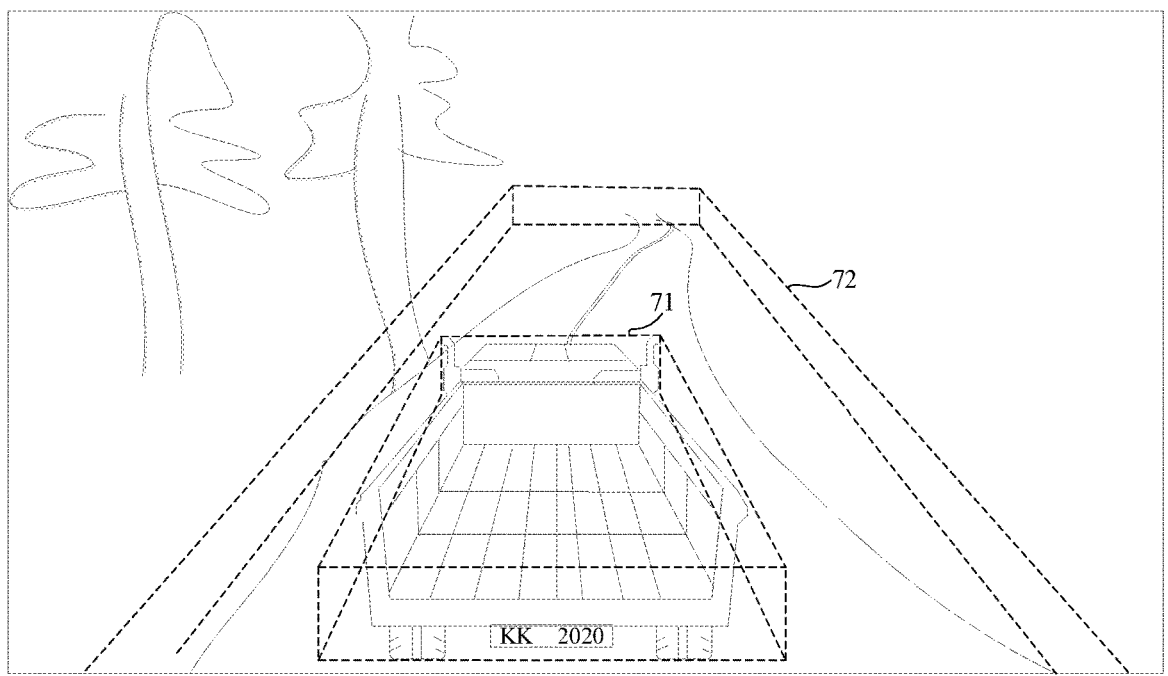
FIG. 7 is a schematic diagram of a collision between collision detection boxes respectively corresponding to a virtual vehicle and an automatic driving region according to an exemplary embodiment of the disclosure.

For example, as shown in FIG. 7, when a first collision detection box 71 corresponding to a virtual car collides with a second collision detection box 72 corresponding to a virtual road, the terminal determines that the virtual car is located in the automatic driving region.

In addition to the foregoing method of determining whether the virtual vehicle is located in the automatic driving region, in other example embodiment, the terminal may further determine whether the virtual vehicle is located in the automatic driving region according to position coordinates of the virtual vehicle in the virtual environment and a region coordinate range corresponding to the automatic driving region (when the coordinates are within the region coordinate range, it is determined that the virtual vehicle is located in the automatic driving region), which is not limited in this embodiment.

Further, when the virtual vehicle is located in the automatic driving region, the terminal receives the marking operation on the map display control, where the process of receiving the marking operation may refer to the foregoing operation 402, and the details are not described again in this embodiment.

Operation 503: Determine the destination according to a marked location indicated by the marking operation, the destination being located in the automatic driving region.

In this embodiment, the virtual vehicle can only achieve automatic driving in the automatic driving region. Therefore, to prevent the virtual vehicle from driving to a region outside the automatic driving region according to the marked location indicated by the marking operation, resulting in abnormal driving of the virtual vehicle (for example, a collision with an obstacle in the virtual environment), in a possible implementation, the terminal determines a destination within the automatic driving region according to the marked location indicated by the marking operation.

The terminal may determine the marked location as the destination when the marked location indicated by the marking operation is located in the automatic driving region. The terminal may determine whether the marked location is located in the automatic driving region according to location coordinates of the marked location and the region coordinate range of the automatic driving region. The specific determining method is not limited in this embodiment.

When the marked location indicated by the marking operation is located outside the automatic driving region, the terminal may determine a location closest to the marked location in the automatic driving region as the destination.

To reduce the learning cost of the user, when the marked location is outside the automatic driving region, the terminal automatically determines the location closest to the marked location in the automatic driving region as the destination, so that automatic driving can be carried out based on the destination subsequently.

Figure 8:
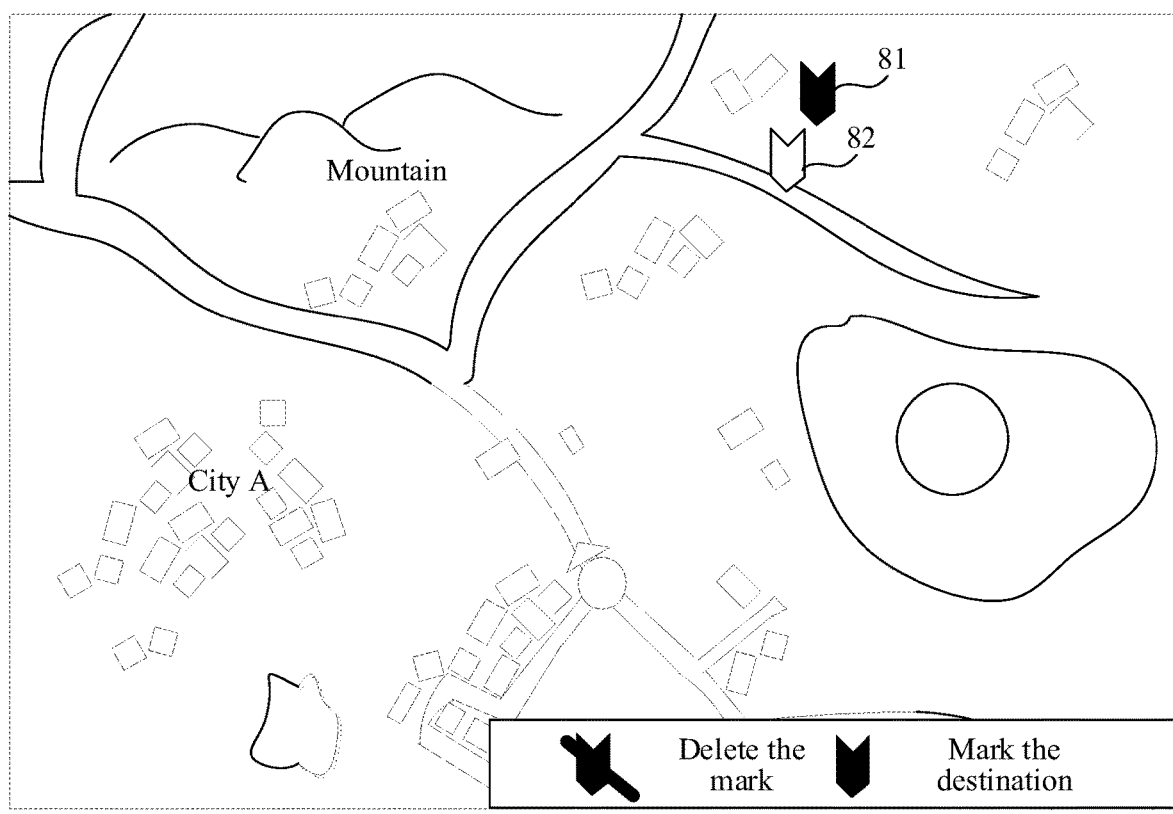
FIG. 8 is a schematic implementation diagram of a process of determining a destination according to a marked location.

For example, as shown in FIG. 8, when the automatic driving region is a preset road in the virtual environment, if a marked location 81 marked on the map by the user is outside the preset road, the terminal determines a location closest to the marked location 81 on the preset road as a destination 82.

In addition to automatically determining the destination according to the marked location, in other example embodiments, when the marked location indicated by the marking operation is outside the automatic driving region, the terminal may further display mark prompt information. The mark prompt information is used for prompting to set a destination in the automatic driving region until the marked location indicated by the marking operation is located in the automatic driving region.

Operation 504: Determine an automatic driving path according to a current location of the virtual vehicle and the destination, the automatic driving path being located in the automatic driving region.

Further, according to the current location of the virtual vehicle and the determined destination, the terminal determines the automatic driving path in the automatic driving region.

There may be more than one path starting from the current location and ending at the destination. For example, when the automatic driving region is a preset road, different fork roads may be selected when driving from the current location to the destination. Therefore, to shorten the driving time of the virtual vehicle, optionally, the automatic driving path is a shortest path from the current location to the destination.

Regarding the method of determining the shortest path, in an example embodiment, the terminal uses a Depth First Search (DFS) algorithm to determine at least one candidate path by using path branch points as nodes (each node is traversed only once), thereby determining a shortest candidate path as the automatic driving path according to a length of each candidate path. The path branch points are preset branch points in the automatic driving region. The terminal may alternatively determine the candidate path through other graph algorithms, and this is not limited in this embodiment.

In other example embodiments, after determining at least one candidate path through a graph algorithm, the terminal displays each candidate path on the map, and determines the automatic driving path according to a selection operation of the user, which is not limited in this embodiment.

Figure 9:
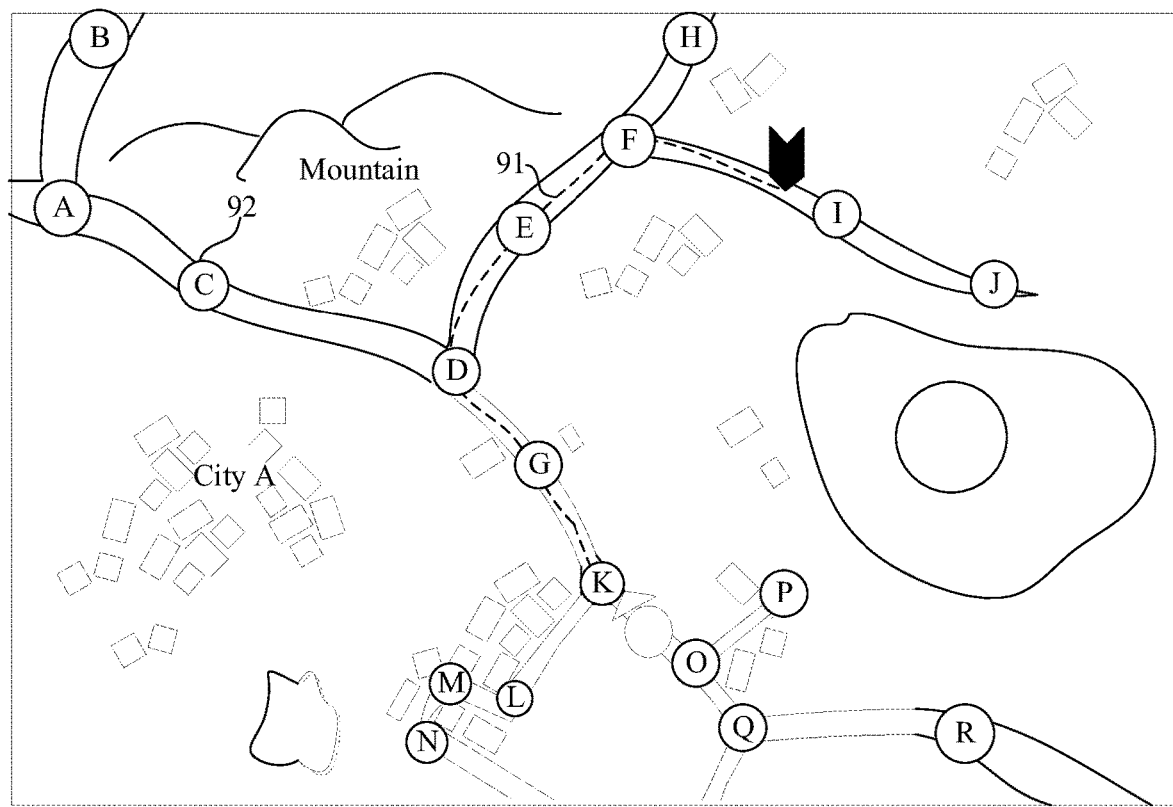
FIG. 9 is a schematic implementation diagram of controlling a virtual vehicle to drive automatically according to waypoints on an automatic driving path.

For example, as shown in FIG. 9, the terminal determines an automatic driving path 91.

Operation 505: Switch the virtual vehicle to the automatic driving mode, and control the virtual vehicle to drive to the destination according to the automatic driving path.

To reduce the difficulty and computation amount of realizing automatic driving, in an example embodiment, waypoints are preset in the automatic driving region. The terminal controls the virtual vehicle to automatically drive to the destination according to the waypoints on the automatic driving path.

This operation includes the following sub-operations.

1. Determine at least two waypoints on the automatic driving path, the waypoints being preset in the automatic driving region.

For example, as shown in FIG. 9, several waypoints 92 are set on a preset road (automatic driving region) in the virtual environment, and the waypoints on the automatic driving path 91 include: K, G, D, E, and F.

2. Control the virtual vehicle to drive to the destination according to a waypoint sequence of the at least two waypoints.

The waypoint sequence refers to a sequence of the waypoints passed by from the current location to the destination on the automatic driving path. In FIG. 9, the waypoint sequence is K→G→D→E→F.

In an example embodiment, when k waypoints are included on the automatic driving path, that the terminal controls the virtual vehicle to drive to the destination according to the waypoint sequence includes the following operations:

1. Control the virtual vehicle to drive from the current location to a $1^{st}$ waypoint according to a first driving direction, the first driving direction pointing from the current location to the $1^{st}$ waypoint.

If no waypoint is set at the current location of the virtual vehicle, the terminal determines the first driving direction according to a current starting point and the $1^{st}$ waypoint on the automatic driving path, thereby controlling the virtual vehicle to drive to the $1^{st}$ waypoint according to the first driving direction.

For example, as shown in FIG. 9, since no waypoint is set at the current location of the virtual vehicle, the terminal first controls the virtual vehicle to drive to a waypoint K (the $1^{st}$ waypoint).

If a waypoint is set at the current location of the virtual vehicle, the terminal directly performs operation 2.

2. Control the virtual vehicle to drive from an $n^{th}$ waypoint to an $(n+1)^{th}$ waypoint according to a second driving direction, the second driving direction pointing from the $n^{th}$ waypoint to the $(n+1)^{th}$ waypoint, and n being an integer greater than or equal to 1 and less than or equal to k−1.

In an example embodiment, a path between adjacent waypoints in the automatic driving region is a straight line (or an approximate straight line) and does not include obstacles. Therefore, when the virtual vehicle drives to the $n^{th}$ waypoint, the terminal determines the second driving direction according to the $n^{th}$ waypoint and the $(n+1)^{th}$ waypoint, thereby controlling the virtual vehicle to drive to the $(n+1)^{th}$ waypoint according to the second driving direction. By repeating this operation, the virtual vehicle drives to a $k^{th}$ waypoint (that is, the last waypoint on the automatic driving path).

For example, as shown in FIG. 9, the terminal controls the virtual vehicle to pass through the waypoints K, G, D, E, and F in sequence.

3. Control the virtual vehicle to drive from a $k^{th}$ waypoint to the destination according to a third driving direction, the third driving direction pointing from the $k^{th}$ waypoint to the destination.

If no waypoint is set at the destination, the terminal determines the third driving direction according to the $k^{th}$ waypoint and the destination, thereby controlling the virtual vehicle to drive to the destination according to the third driving direction.

For example, as shown in FIG. 9, since the destination is located between waypoints F and I (no waypoint is set), the terminal controls the virtual vehicle to automatically drive to the destination according to a direction in which the waypoint F points to the destination.

Operation 506: Switch the virtual vehicle to the manual driving mode in response to the virtual vehicle driving to the destination, and control the virtual vehicle to stop driving.

In a possible implementation, after controlling the virtual vehicle to drive to the destination through the foregoing operations, the terminal automatically switches the virtual vehicle to the manual driving mode and controls the virtual vehicle to stop at the destination.

Since the marked location marked by the user may not completely coincide with the destination, the terminal may automatically display the marked location on the map display control after switching the virtual vehicle to the manual driving mode, so that the user can manually control the virtual vehicle to drive to the marked location according to a relative position relationship between the marked location and the destination.

When the marked location is different from the destination, the terminal automatically controls the virtual vehicle to turn to the direction of the destination.

In this embodiment, when the marked location manually set by the user is outside the automatic driving region, the terminal determines from the automatic driving region the destination closest to the marked location, and then determines the automatic driving path according to the destination and the current location, to avoid driving abnormalities caused by the virtual vehicle automatically driving to the non-automatic driving region.

In addition, in this embodiment, by setting waypoints on the automatic driving region, the terminal can determine the driving direction of the virtual vehicle according to the waypoints on the automatic driving path after determining the automatic driving path, and then control the virtual vehicle to automatically drive according to the driving direction. That is, the terminal only needs to process and calculate a small amount of data when realizing automatic driving, which reduces the difficulty and the computation amount when realizing automatic driving.

Moreover, in this embodiment, collision detection boxes are set for the automatic driving region, to determine whether the virtual vehicle is located in the automatic driving region by using the collision detection boxes, which helps simplify the process of determining the location of the virtual vehicle.

In an example embodiment, in the manual driving mode, the driving controls are displayed in the UI, and the driving controls are in a clickable state. To prevent the user from accidentally touching the driving controls and exiting the automatic driving mode during automatic driving, in the automatic driving mode, the terminal sets the driving controls in the UI to a non-clickable state, or cancels the display of the driving controls.

Correspondingly, when the virtual vehicle drives to the destination, the terminal sets the driving controls to the clickable state, or resumes displaying the driving controls, so that the user can continue to manually control the virtual vehicle to drive.

In the manual driving mode, to simulate a real driving scenario, the virtual object cannot use virtual items, for example, the virtual object cannot use virtual supply bottles, cannot use virtual attack items to attack other virtual objects in the virtual environment, and cannot use virtual throwing items. Correspondingly, the terminal does not display an item use control.

In this embodiment of the disclosure, the virtual vehicle can automatically drive in the virtual environment in the automatic driving mode without manual control by the user. Therefore, to enable the user to use a virtual item during the automatic driving of the vehicle, the terminal displays the item use control, so that the user can use the virtual item by triggering the item use control.

The item use control is a use control corresponding to a virtual attacking item, such as a shooting control of a virtual rifle, or a use control corresponding to a virtual supply item, such as a use control of a virtual bandage, or a use control corresponding to a virtual throwing item, such as a throwing control of a virtual grenade, or the like. The type of the item use control is not limited in this embodiment of the disclosure. Correspondingly, when receiving a trigger operation on the item use control, the terminal controls the virtual object to use the virtual item. When switching the virtual vehicle back to the manual driving mode, the terminal cancels the display of the item use control.

Figure 10:
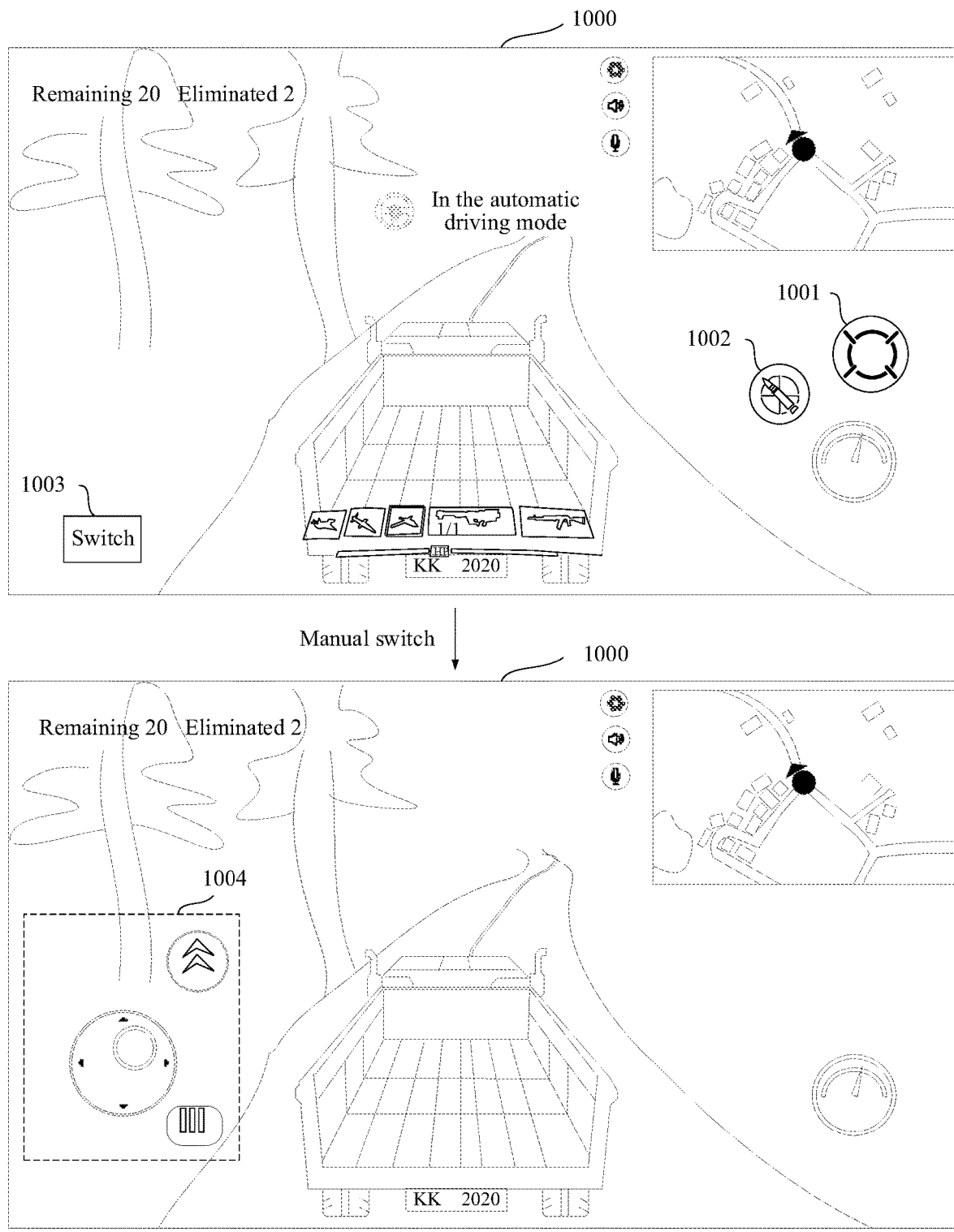
FIG. 10 is a schematic diagram of user interfaces (UIs) in an automatic driving mode and a manual driving mode.

For example, as shown in FIG. 10, in the automatic driving mode, the terminal cancels the display of driving controls 1004 in a UI 1000, and displays an aiming control 1001 and a firing control 1002 in the UI 1000.

If in the automatic driving mode, the driving controls in the UI are set to the non-clickable state, or the display of the driving controls is canceled, the user cannot manually control the virtual vehicle during the automatic driving. In actual situations, when attacked by other virtual objects in the virtual environment, the user often needs to change the driving route to avoid the attack. Therefore, in a possible implementation, in the automatic driving mode, the UI displays a driving mode switching control. The terminal switches, in response to a trigger operation on the driving mode switching control, the virtual vehicle to the manual driving mode and sets the driving controls to the clickable state, or resumes displaying the driving controls.

For example, as shown in FIG. 10, in the automatic driving mode, a driving mode switching control 1003 is displayed in the UI 1000. When a click operation on the driving mode switching control 1003 is received, the terminal controls the virtual vehicle to exit the automatic driving mode, and displays the driving controls 1004 in the UI 1000 again (cancels the display of an attack control simultaneously).

In this embodiment, in the automatic driving mode, the terminal sets the driving controls to the non-clickable state, or cancels the display of the driving controls, to prevent the user from accidentally touching the driving controls and exiting the automatic driving mode. In addition, the terminal displays the driving mode switching control on the UI, so that the user can exit the automatic driving mode by triggering the control.

Figure 11:
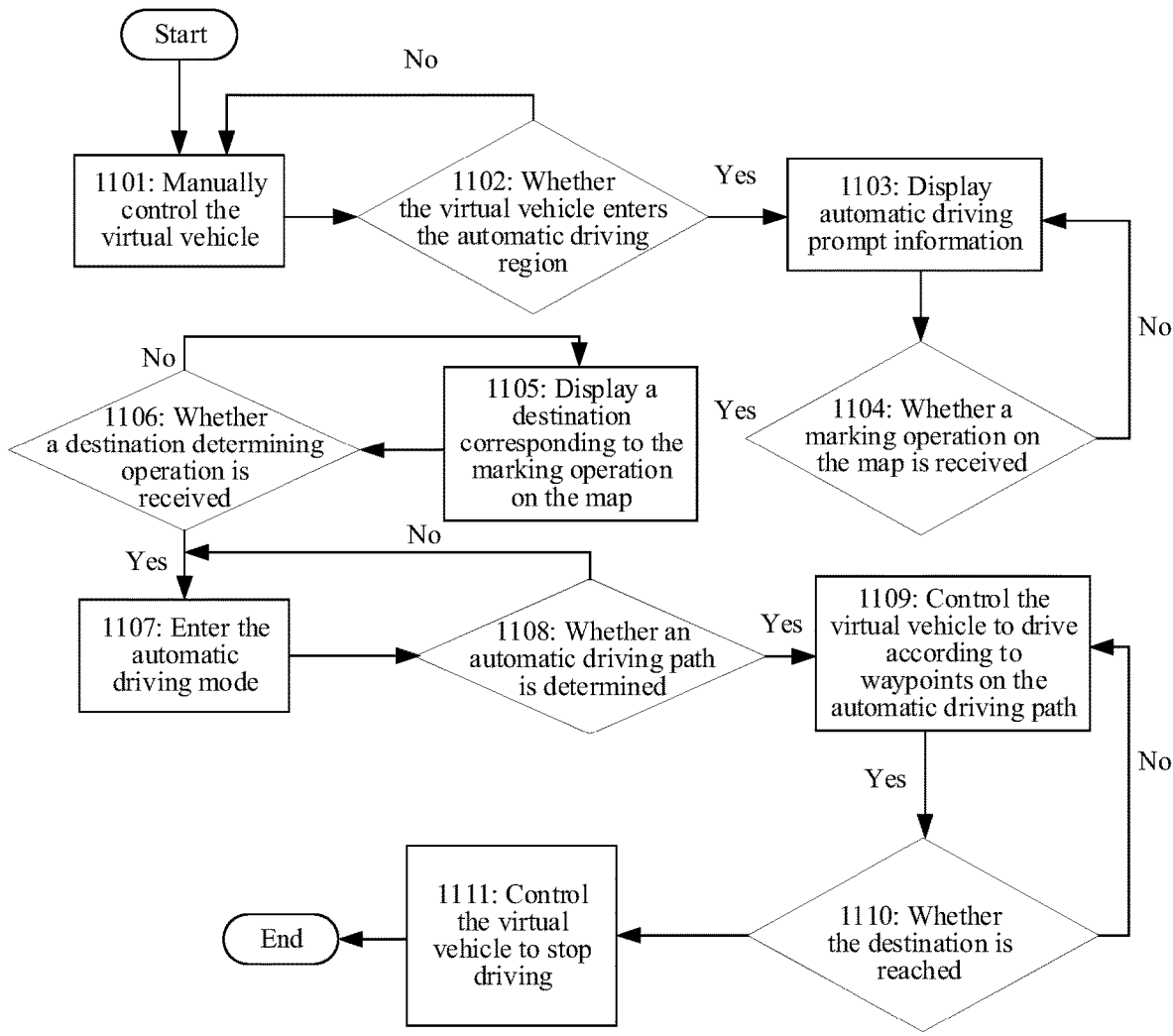
FIG. 11 is a flowchart of a method for driving a vehicle in a virtual environment according to an example embodiment of the disclosure.

With reference to the foregoing embodiments, in an illustrative example, the process of controlling the automatic driving of the virtual vehicle is shown in FIG. 11.

Operation 1101: Manually control the virtual vehicle.

Operation 1102: Whether the virtual vehicle enters the automatic driving region. If the virtual vehicle enters the automatic driving region, operation 1103 is performed, or otherwise, operation 1101 is performed.

Operation 1103: Display automatic driving prompt information.

Operation 1104: Whether a marking operation on the map is received. If the marking operation is received, operation 1105 is performed, or otherwise, operation 1103 is performed.

Operation 1105: Display a destination corresponding to the marking operation on the map.

Operation 1106: Whether a destination determining operation is received. If the destination determining operation is received, operation 1107 is performed, or otherwise, operation 1105 is performed.

Operation 1107: Enter the automatic driving mode.

Operation 1108: Whether an automatic driving path is determined. If the automatic driving path is determined, operation 1109 is performed, or otherwise, operation 1107 is performed.

Operation 1109: Control the virtual vehicle to drive according to waypoints on the automatic driving path.

Operation 1110: Whether the destination is reached. If the destination is reached, operation 1111 is performed, or otherwise, operation 1109 is performed.

Operation 1111: Control the virtual vehicle to stop driving.

Figure 12:
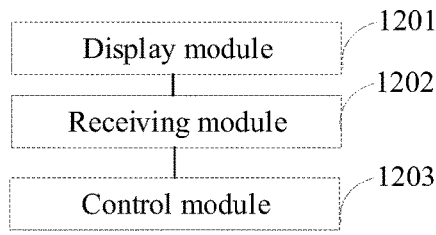
FIG. 12 is a structural block diagram of an apparatus for driving a vehicle in a virtual environment according to an example embodiment of the disclosure.

FIG. 12 is a structural block diagram of an apparatus for driving a vehicle in a virtual environment according to an example embodiment of the disclosure. The apparatus includes:

a display module 1201, configured to display a driving picture and a map display control, the driving picture being a picture in which a virtual object drives a virtual vehicle in a virtual environment, and the virtual vehicle being in a manual driving mode;

a receiving module 1202, configured to receive a marking operation on the map display control in response to the virtual vehicle being located in an automatic driving region in the virtual environment, the marking operation being an operation of marking a location in the map display control; and a control module 1203, configured to switch the virtual vehicle to an automatic driving mode in response to the marking operation, and control the virtual vehicle to automatically drive to a destination.

The control module 1203 is further configured to:

determine the destination according to a marked location indicated by the marking operation, the destination being located in the automatic driving region;

determine an automatic driving path according to a current location of the virtual vehicle and the destination, the automatic driving path being located in the automatic driving region; and switch the virtual vehicle to the automatic driving mode, and control the virtual vehicle to drive to the destination according to the automatic driving path.

When controlling the virtual vehicle to drive to the destination according to the automatic driving path, the control module 1203 is configured to:

determine at least two waypoints on the automatic driving path, the waypoints being preset in the automatic driving region; and control the virtual vehicle to drive to the destination according to a waypoint sequence of the at least two waypoints.

The automatic driving path includes k waypoints, k being an integer greater than or equal to 2; and when controlling the virtual vehicle to drive to the destination according to a waypoint sequence of the at least two waypoints, the control module 1203 is configured to:

control the virtual vehicle to drive from the current location to a $1^{st}$ waypoint according to a first driving direction, the first driving direction pointing from the current location to the $1^{st}$ waypoint;

control the virtual vehicle to drive from an $n^{th}$ waypoint to an $(n+1)^{th}$ waypoint according to a second driving direction, the second driving direction pointing from the $n^{th}$ waypoint to the $(n+1)^{th}$ waypoint, and n being an integer greater than or equal to 1 and less than or equal to k−1; and control the virtual vehicle to drive from a $k^{th}$ waypoint to the destination according to a third driving direction, the third driving direction pointing from the $k^{th}$ waypoint to the destination.

When determining the destination according to a marked location indicated by the marking operation, the control module 1203 is configured to:

determine the marked location as the destination in response to the marked location indicated by the marking operation being located in the automatic driving region; and determine, in response to the marked location indicated by the marking operation being located outside the automatic driving region, a location closest to the marked location in the automatic driving region as the destination or display mark prompt information, the mark prompt information being used for prompting to set the destination in the automatic driving region.

When determining an automatic driving path according to a current location of the virtual vehicle and the destination, the control module 1203 is configured to:

determine at least one candidate path between the current location and the destination through a DFS algorithm by using path branch points in the virtual environment as nodes, the path branch nodes being branch points preset in the automatic driving region; and determine a shortest candidate path as the automatic driving path.

The receiving module 1203 is further configured to:

determine that the virtual vehicle is located in the automatic driving region in response to a collision between a first collision detection box and a second collision detection box, the first collision detection box being a collision detection box corresponding to the virtual vehicle, and the second collision detection box being a collision detection box corresponding to the automatic driving region.

The apparatus further includes:

a first switching module, configured to switch the virtual vehicle to the manual driving mode in response to the virtual vehicle driving to the destination, and control the virtual vehicle to stop driving.

Driving controls are displayed in the manual driving mode, and the driving controls are in a clickable state; and the apparatus further includes:

a setting module, configured to set, in the automatic driving mode, the driving controls to a non-clickable state or cancel the display of the driving controls; and set, in response to the virtual vehicle driving to the destination, the driving controls to the clickable state or resume displaying the driving controls.

The apparatus further includes:

a second switching module, configured to display a driving mode switching control in the automatic driving mode; and switch, in response to a trigger operation on the driving mode switching control, the virtual vehicle to the manual driving mode and set the driving controls to the clickable state, or resume displaying the driving controls.

An item use control is not displayed in the manual driving mode, the item use control being used for controlling the virtual object to use a virtual item; and the apparatus further includes:

an item control display module, configured to display the item use control in the automatic driving mode; and an item use module, configured to control the virtual object to use the virtual item in response to a trigger operation on the item use control.

The automatic driving region includes a preset road in the virtual environment.

Based on the above, in the embodiments of the disclosure, when the virtual vehicle drives to the automatic driving region in the virtual environment in the manual driving mode, the virtual vehicle is switched to the automatic driving mode according to the marking operation if the marking operation on the map display control is received, and the virtual vehicle is controlled to automatically drive to the destination. There is no need for the user to manually control the virtual vehicle, which simplifies the process of controlling the virtual vehicle to drive, and reduces the operation difficulty of the user to control the virtual vehicle to drive in the virtual environment.

In this embodiment, when the marked location manually set by the user is outside the automatic driving region, the terminal determines from the automatic driving region the destination closest to the marked location, and then determines the automatic driving path according to the destination and the current location, to avoid driving abnormalities caused by the virtual vehicle automatically driving to the non-automatic driving region.

In addition, in this embodiment, the waypoints are set on the automatic driving region, so that the driving direction of the virtual vehicle is determined according to the waypoints on the automatic driving path after determining the automatic driving path, and then the virtual vehicle is controlled to automatically drive according to the driving direction. Therefore, automatic driving is implemented, and the difficulty and the computation amount when realizing automatic driving are reduced.

Moreover, in this embodiment, collision detection boxes are set for the automatic driving region, to determine whether the virtual vehicle is located in the automatic driving region by using the collision detection boxes, which helps simplify the process of determining the location of the virtual vehicle.

In this embodiment, in the automatic driving mode, the terminal sets the driving controls to the non-clickable state, or cancels the display of the driving controls, to prevent the user from accidentally touching the driving controls and exiting the automatic driving mode. In addition, the terminal displays the driving mode switching control on the UI, so that the user can exit the automatic driving mode by triggering the control.

Figure 13:
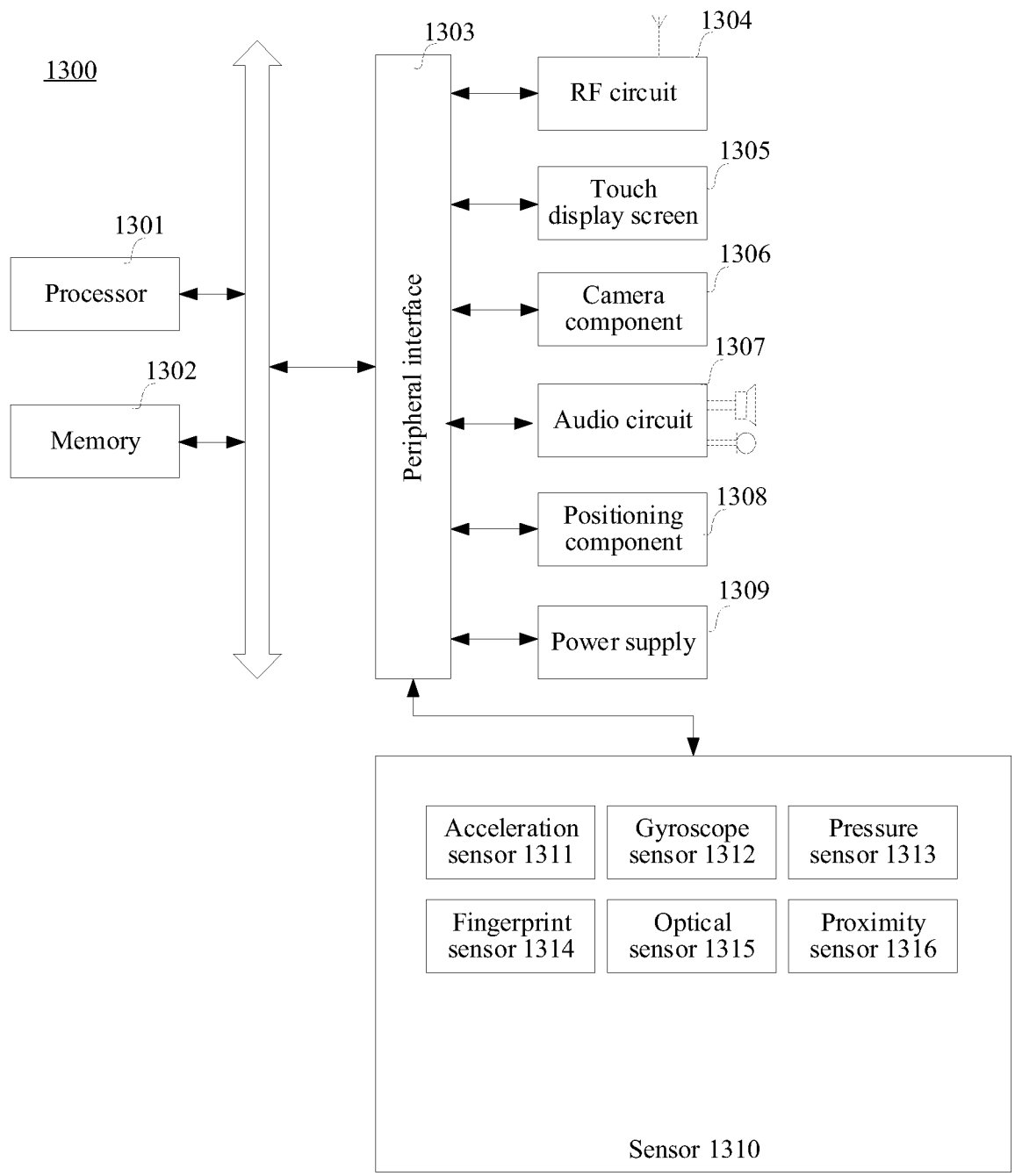
FIG. 13 is a structural block diagram of a terminal according to an example embodiment of the disclosure.

FIG. 13 is a structural block diagram of a terminal 1300 according to an example embodiment of the disclosure. The terminal 1300 may be a portable mobile terminal, for example, a smartphone, a tablet computer, a Moving Picture Experts Group Audio Layer III (MP3) player, or a Moving Picture Experts Group Audio Layer IV (MP4) player. The terminal 1300 may be further referred to as other names such as user equipment and a portable terminal.

Generally, the terminal 1300 includes a processor 1301 and a memory 1302.

The processor 1301 may include one or more processing cores, for example, a 4-core processor or an 8-core processor. The processor 1301 may be implemented by using at least one hardware form of a digital signal processor (DSP), a field-programmable gate array (FPGA), and a programmable logic array (PLA). The processor 1301 may alternatively include a main processor and a coprocessor. The main processor is configured to process data in an awake state, also referred to as a central processing unit (CPU). The coprocessor is a low-power processor configured to process data in a standby state. In some embodiments, the processor 1301 may be integrated with a graphics processing unit (GPU). The GPU is configured to render and draw content that needs to be displayed on a display. In some embodiments, the processor 1301 may further include an artificial intelligence (AI) processor. The AI processor is configured to process computing operations related to machine learning.

The memory 1302 may include one or more computer-readable storage media. The computer-readable storage medium may be tangible and non-transient. The memory 1302 may further include a high-speed random access memory (RAM), and a non-volatile memory such as one or more magnetic disk storage devices and a flash storage device. In some embodiments, a non-transitory computer-readable storage medium in the memory 1302 is configured to store at least one instruction, the at least one instruction being configured to be executed by the processor 1301 to implement the method provided in the embodiments of the disclosure.

In some embodiments, the terminal 1300 may include a peripheral interface 1303 and at least one peripheral. Specifically, the peripheral includes: at least one of a radio frequency (RF) circuit 1304, a touch display screen 1305, a camera component 1306, an audio circuit 1307, a positioning component 1308, or a power supply 1309.

The peripheral interface 1303 may be configured to connect the at least one peripheral related to Input/Output (I/O) to the processor 1301 and the memory 1302. In some embodiments, the processor 1301, the memory 1302, and the peripheral interface 1303 are integrated on the same chip or the same circuit board. In some other embodiments, any one or two of the processor 1301, the memory 1302, and the peripheral interface 1303 may be implemented on an independent chip or circuit board. This is not limited in this embodiment.

The RF circuit 1304 is configured to receive and transmit an RF signal, which is also referred to as an electromagnetic signal. The RF circuit 1304 communicates with a communication network and another communication device by using the electromagnetic signal. The RF circuit 1304 converts an electrical signal into an electromagnetic signal for transmission, or converts a received electromagnetic signal into an electrical signal. The RF circuit 1304 may include: an antenna system, an RF transceiver, one or more amplifiers, a tuner, an oscillator, a DSP, a codec chip set, a subscriber identity module card, and the like. The RF circuit 1304 may communicate with another terminal by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 1304 may further include a circuit related to NFC, which is not limited in the disclosure.

The touch display screen 1305 is configured to display a UI. The UI may include a graph, text, an icon, a video, and any combination thereof. The touch display screen 1305 also has a capability of acquiring a touch signal on or above a surface of the touch display screen 1305. The touch signal may be inputted, as a control signal, to the processor 1301 for processing. The touch display screen 1305 is configured to provide a virtual button and/or a virtual keyboard, which is also referred to as a soft button and/or a soft keyboard. In some embodiments, there may be one touch display screen 1305, disposed on a front panel of the terminal 1300. In some other embodiments, there may be at least two touch display screens 1305, disposed on different surfaces of the terminal 1300 respectively or in a folded design. In still other embodiments, the touch display screen 1305 may be a flexible display screen disposed on a curved surface or a folded surface of the terminal 1300. Even, the touch display screen 1305 may be further set in a non-rectangular irregular pattern, namely, a special-shaped screen. The touch display screen 1305 may be made of a material such as a liquid crystal display (LCD) or an organic light-emitting diode (OLED).

The camera component 1306 is configured to acquire an image or a video. The camera component 1306 may include a front-facing camera and a rear-facing camera. Generally, the front-facing camera is configured to implement a video call or self-portrait. The rear-facing camera is configured to capturing a picture or a video. In some embodiments, there are at least two rear-facing cameras, each of which is any one of a main camera, a depth of field camera and a wide-angle camera, to implement a background blurring function by fusing the main camera and the depth of field camera, and panoramic shooting and VR shooting functions by fusing the main camera and the wide-angle camera. In some embodiments, the camera component 1306 may further include a flash. The flash may be a single color temperature flash or a double color temperature flash. The double color temperature flash refers to a combination of a warm light flash and a cold light flash, and may be used for light compensation under different color temperatures.

The audio circuit 1307 is configured to provide an audio interface between a user and the terminal 1300. The audio circuit 1307 may include a microphone and a speaker. The microphone is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound acquisition or noise reduction, there may be a plurality of microphones, respectively disposed at different parts of the terminal 1300. The microphone may be further a microphone array or an omnidirectional acquisition microphone. The speaker is configured to convert electric signals from the processor 1301 or the RF circuit 1304 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1307 may further include an earphone jack.

The positioning component 1308 is configured to position a current geographic location of the terminal 1300 for implementing navigation or a location-based service (LBS). The positioning component 1308 may be a positioning component based on the Global Positioning System (GPS) of the United States, the BeiDou system of China, or the GALILEO System of the European Union.

The power supply 1309 is configured to supply power to assemblies in the terminal 1300. The power supply 1309 may be an alternating current, a direct current, a primary battery, or a rechargeable battery. When the power supply 1309 includes a rechargeable battery, the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charge technology.

In some embodiments, the terminal 1300 further includes one or more sensors 1310. The one or more sensors 1310 include, but are not limited to, an acceleration sensor 1311, a gyroscope sensor 1312, a pressure sensor 1313, a fingerprint sensor 1314, an optical sensor 1315, and a proximity sensor 1316.

The acceleration sensor 1311 may detect a magnitude of acceleration on three coordinate axes of a coordinate system established with the terminal 1300. For example, the acceleration sensor 1311 may be configured to detect a component of gravity acceleration on the three coordinate axes. The processor 1301 may control, according to a gravity acceleration signal acquired by the acceleration sensor 1311, the touch display screen 1305 to display the UI in a frame view or a portrait view. The acceleration sensor 1311 may be further configured to acquire motion data of a game or a user.

The gyroscope sensor 1312 may detect a body direction and a rotation angle of the terminal 1300. The gyroscope sensor 1312 may cooperate with the acceleration sensor 1311 to acquire a 3D action by the user on the terminal 1300. The processor 1301 may implement the following functions according to the data acquired by the gyroscope sensor 1312: motion sensing (such as changing the UI according to a tilt operation of the user), image stabilization at shooting, game control, and inertial navigation.

The pressure sensor 1313 may be disposed at a side frame of the terminal 1300 and/or a lower layer of the touch display screen 1305. When the pressure sensor 1313 is disposed at the side frame of the terminal 1300, a holding signal of the user on the terminal 1300 may be detected, and left/right hand identification and a quick action may be performed according to the holding signal. When the pressure sensor 1313 is disposed at the lower layer of the touch display screen 1305, an operable control on the UI interface can be controlled according to a pressure operation of the user on the touch display screen 1305. The operable control includes at least one of a button control, a scroll-bar control, an icon control, or a menu control.

The fingerprint sensor 1314 is configured to acquire a user's fingerprint to identify a user's identity according to the acquired fingerprint. When identifying that the identity of the user is a trusted identity, the processor 1301 authorizes the user to perform related sensitive operations. The sensitive operations include: unlocking a screen, viewing encrypted information, downloading software, paying, changing a setting, and the like. The fingerprint sensor 1314 may be disposed on a front surface, a back surface, or a side surface of the terminal 1300. When a physical button or a vendor logo is disposed on the terminal 1300, the fingerprint 1314 may be integrated with the physical button or the vendor logo.

The optical sensor 1315 is configured to acquire ambient light intensity. In an embodiment, the processor 1301 may control display brightness of the display screen 1305 according to the ambient light intensity acquired by the optical sensor 1315. Specifically, in a case that the ambient light intensity is relatively high, the display brightness of the touch display screen 1305 is increased. In a case that the ambient light intensity is relatively low, the display brightness of the touch display screen 1305 is reduced. In another embodiment, the processor 1301 may further dynamically adjust a camera parameter of the camera component 1306 according to the ambient light intensity acquired by the optical sensor 1315.

The proximity sensor 1316, also referred to as a distance sensor, is generally disposed on the front surface of the terminal 1300. The proximity sensor 1316 is configured to acquire a distance between the user and the front surface of the terminal 1300. In an embodiment, when the proximity sensor 1316 detects that the distance between the user and the front surface of the terminal 1300 gradually becomes small, the touch display screen 1305 is controlled by the processor 1301 to switch from a screen-on state to a screen-off state. When the proximity sensor 1316 detects that the distance between the user and the front surface of the terminal 1300 gradually increases, the touch display screen 1305 is controlled by the processor 1301 to switch from the screen-off state to the screen-on state.

A person skilled in the art may understand that the structure shown in FIG. 13 does not constitute a limitation to the terminal 1300, and the terminal may include more or fewer components than those shown in the figure, or some components may be combined, or a different component arrangement may be used.

An embodiment of the disclosure further provides a computer-readable storage medium, the storage medium storing at least one instruction, at least one program, a code set, or an instruction set, and the at least one instruction, the at least one program, the code set or the instruction set being loaded and executed by a processor to implement the method for driving a vehicle in a virtual environment according to any one of the foregoing embodiments.

The disclosure further provides a computer program product or a computer program. The computer program product or the computer program includes computer instructions, and the computer instructions are stored in a computer-readable storage medium. A processor of the computer device reads the computer instructions from the computer-readable storage medium and executes the computer instructions, to cause the computer device to perform the method for driving a vehicle in a virtual environment provided in the foregoing aspect.

A person of ordinary skill in the art may understand that all or some of the operations of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. A method for driving a vehicle in a virtual environment, performed by a terminal, the method comprising:
displaying a driving picture and a map display control, the driving picture being a picture in which a virtual object drives a virtual vehicle in a virtual environment, and the virtual vehicle being in a manual driving mode;
receiving a marking operation on the map display control in response to the virtual vehicle being located in an automatic driving region in the virtual environment, the marking operation being an operation of marking a location in the map display control; and
switching the virtual vehicle to an automatic driving mode in response to the marking operation, and controlling the virtual vehicle to automatically drive to a destination,
wherein the switching comprises:
determining the destination according to a marked location indicated by the marking operation, the destination being located in the automatic driving region;
determining an automatic driving path according to a current location of the virtual vehicle and the destination, the automatic driving path being located in the automatic driving region;
switching the virtual vehicle to the automatic driving mode; and
controlling the virtual vehicle to drive to the destination according to the automatic driving path, and
wherein the determining the automatic driving path according to the current location of the virtual vehicle and the destination comprises:
determining at least one candidate path between the current location and the destination by using path branch points in the virtual environment as nodes, the path branch nodes being branch points preset in the automatic driving region; and
determining a shortest candidate path as the automatic driving path.

2. The method according to claim 1, wherein the controlling the virtual vehicle to drive to the destination according to the automatic driving path comprises:
determining at least two waypoints on the automatic driving path, the waypoints being preset in the automatic driving region; and
controlling the virtual vehicle to drive to the destination according to a waypoint sequence of the at least two waypoints.

3. The method according to claim 2, wherein the automatic driving path comprises k waypoints, k being an integer greater than or equal to 2; and
the controlling the virtual vehicle to drive to the destination according to a waypoint sequence of the at least two waypoints comprises:
controlling the virtual vehicle to drive from the current location to a $1^{st}$ waypoint according to a first driving direction, the first driving direction pointing from the current location to the $1^{st}$ waypoint;
controlling the virtual vehicle to drive from an $n^{th}$ waypoint to an $(n+1)^{th}$ waypoint according to a second driving direction, the second driving direction pointing from the $n^{th}$ waypoint to the $(n+1)^{th}$ waypoint, and n being an integer greater than or equal to 1 and less than or equal to k−1; and
controlling the virtual vehicle to drive from a $k^{th}$ waypoint to the destination according to a third driving direction, the third driving direction pointing from the $k^{th}$ waypoint to the destination.

4. The method according to claim 1, wherein the determining the destination according to the marked location indicated by the marking operation comprises:
determining the marked location as the destination in response to the marked location indicated by the marking operation being located in the automatic driving region; and
determining, in response to the marked location indicated by the marking operation being located outside the automatic driving region, a location closest to the marked location in the automatic driving region as the destination or displaying mark prompt information, the mark prompt information being used for prompting to set the destination in the automatic driving region.

5. The method according to claim 1, wherein the determining the at least one candidate path between the current location and the destination is through a Depth First Search (DFS) algorithm.

6. The method according to claim 1, further comprising:
determining that the virtual vehicle is located in the automatic driving region in response to a collision between a first collision detection box and a second collision detection box, the first collision detection box being a collision detection box corresponding to the virtual vehicle, and the second collision detection box being a collision detection box corresponding to the automatic driving region.

7. The method according to claim 1, wherein after the switching the virtual vehicle to an automatic driving mode in response to the marking operation, and controlling the virtual vehicle to automatically drive to a destination, the method further comprises:
switching the virtual vehicle to the manual driving mode in response to the virtual vehicle driving to the destination, and controlling the virtual vehicle to stop driving.

8. The method according to claim 1 wherein driving controls are displayed in the manual driving mode, and the driving controls are in a clickable state; and
the method further comprises:
setting, in the automatic driving mode, the driving controls to a non-clickable state or canceling the display of the driving controls; and
setting, in response to the virtual vehicle driving to the destination, the driving controls to the clickable state or resuming displaying the driving controls.

9. The method according to claim 8, further comprising:
displaying a driving mode switching control in the automatic driving mode; and
switching, in response to a trigger operation on the driving mode switching control, the virtual vehicle to the manual driving mode and setting the driving controls to the clickable state, or resuming displaying the driving controls.

10. The method according to claim 1, wherein an item use control is not displayed in the manual driving mode, the item use control being used for controlling the virtual object to use a virtual item; and after the switching the virtual vehicle to an automatic driving mode in response to the marking operation, the method further comprises:
  displaying the item use control in the automatic driving mode; and
  controlling the virtual object to use the virtual item in response to a trigger operation on the item use control.

11. The method according to claim 1, wherein the automatic driving region comprises a preset road in the virtual environment.

12. An apparatus for driving a vehicle in a virtual environment, comprising:
  at least one memory configured to store computer program code;
  at least one processor configured to operate as instructed by the computer program code, the computer program code including:
    display code configured to cause the at least one processor to display a driving picture and a map display control, the driving picture being a picture in which a virtual object drives a virtual vehicle in a virtual environment, and the virtual vehicle being in a manual driving mode;
    receiving code configured to cause that at least one processor to receive a marking operation on the map display control in response to the virtual vehicle being located in an automatic driving region in the virtual environment, the marking operation being an operation of marking a location in the map display control; and
    control code configured to cause the at least one processor to switch the virtual vehicle to an automatic driving mode in response to the marking operation, and control the virtual vehicle to automatically drive to a destination,
  wherein the control code is further configured to cause the at least one processor to:
    determine the destination according to a marked location indicated by the marking operation, the destination being located in the automatic driving region;
    determine an automatic driving path according to a current location of the virtual vehicle and the destination, the automatic driving path being located in the automatic driving region; and
    switch the virtual vehicle to the automatic driving mode, and control the virtual vehicle to drive to the destination according to the automatic driving path, and
  wherein determining the automatic driving path according to the current location of the virtual vehicle and the destination comprises:
    determining at least one candidate path between the current location and the destination by using path branch points in the virtual environment as nodes, the path branch nodes being branch points preset in the automatic driving region; and
    determining a shortest candidate path as the automatic driving path.

13. The apparatus according to claim 12, wherein the control the virtual vehicle to drive to the destination according to the automatic driving path comprises:
  determining at least two waypoints on the automatic driving path, the waypoints being preset in the automatic driving region; and
  controlling the virtual vehicle to drive to the destination according to a waypoint sequence of the at least two waypoints.

14. The apparatus according to claim 13, wherein the automatic driving path comprises k waypoints, k being an integer greater than or equal to 2; and
  the controlling the virtual vehicle to drive to the destination according to a waypoint sequence of the at least two waypoints comprises:
    controlling the virtual vehicle to drive from the current location to a $1^{st}$ waypoint according to a first driving direction, the first driving direction pointing from the current location to the $1^{st}$ waypoint;
    controlling the virtual vehicle to drive from an $n^{th}$ waypoint to an $(n+1)^{th}$ waypoint according to a second driving direction, the second driving direction pointing from the $n^{th}$ waypoint to the $(n+1)^{th}$ waypoint, and n being an integer greater than or equal to 1 and less than or equal to k−1; and
    controlling the virtual vehicle to drive from a $k^{th}$ waypoint to the destination according to a third driving direction, the third driving direction pointing from the $k^{th}$ waypoint to the destination.

15. The apparatus according to claim 12, wherein the determine the destination according to the marked location indicated by the marking operation comprises:
  determining the marked location as the destination in response to the marked location indicated by the marking operation being located in the automatic driving region; and
  determining, in response to the marked location indicated by the marking operation being located outside the automatic driving region, a location closest to the marked location in the automatic driving region as the destination or displaying mark prompt information, the mark prompt information being used for prompting to set the destination in the automatic driving region.

16. The apparatus according to claim 12, wherein determining the at least one candidate path between the current location and the destination is through a Depth First Search (DFS) algorithm.

17. The apparatus according to claim 12, wherein the receiving code is configured to cause the at least one processor to:
  determine that the virtual vehicle is located in the automatic driving region in response to a collision between a first collision detection box and a second collision detection box, the first collision detection box being a collision detection box corresponding to the virtual vehicle, and the second collision detection box being a collision detection box corresponding to the automatic driving region.

18. A non-volatile computer-readable storage medium, storing computer code that when executed by at least one processor causes the at least one processor to:
  display a driving picture and a map display control, the driving picture being a picture in which a virtual object drives a virtual vehicle in a virtual environment, and the virtual vehicle being in a manual driving mode;
  receive a marking operation on the map display control in response to the virtual vehicle being located in an automatic driving region in the virtual environment, the marking operation being an operation of marking a location in the map display control; and
  implement a switching of the virtual vehicle to an automatic driving mode in response to the marking operation, and control the virtual vehicle to automatically drive to a destination,
  wherein the switching comprises:

determining the destination according to a marked location indicated by the marking operation, the destination being located in the automatic driving region;

determining an automatic driving path according to a current location of the virtual vehicle and the destination, the automatic driving path being located in the automatic driving region; and switching the virtual vehicle to the automatic driving mode, and controlling the virtual vehicle to drive to the destination according to the automatic driving path, and wherein the determining the automatic driving path according to the current location of the virtual vehicle and the destination comprises:

determining at least one candidate path between the current location and the destination by using path branch points in the virtual environment as nodes, the path branch nodes being branch points preset in the automatic driving region; and determining a shortest candidate path as the automatic driving path.

\* \* \* \* \*